US012649256B2

(12) United States Patent
Inoue et al.

(10) Patent No.: US 12,649,256 B2
(45) Date of Patent: Jun. 9, 2026

(54) SCARFING MACHINE

(71) Applicant: MEINAN MACHINERY WORKS, INC., Aichi (JP)

(72) Inventors: Shinya Inoue, Obu (JP); Michito Ninomiya, Obu (JP); Yasuhiro Koike, Obu (JP)

(73) Assignee: MEINAN MACHINERY WORKS, INC., Aichi (JP)

( * ) Notice: Subject to any disclaimer, the term of this patent is extended or adjusted under 35 U.S.C. 154(b) by 283 days.

(21) Appl. No.: 18/578,152

(22) PCT Filed: Feb. 10, 2022

(86) PCT No.: PCT/JP2022/005248
§ 371 (c)(1),
(2) Date: Jan. 10, 2024

(87) PCT Pub. No.: WO2023/026516
PCT Pub. Date: Mar. 2, 2023

(65) Prior Publication Data

US 2024/0326283 A1 Oct. 3, 2024

(30) Foreign Application Priority Data

Aug. 25, 2021 (JP) ................................ 2021-137079

(51) Int. Cl.
*B27D 1/10* (2006.01)

(52) U.S. Cl.
CPC ..................................... *B27D 1/10* (2013.01)

(58) Field of Classification Search
CPC ................................. B27D 1/10; B27D 5/006
See application file for complete search history.

(56) References Cited

U.S. PATENT DOCUMENTS

| | | | | |
|---|---|---|---|---|
| 5,372,168 A * | 12/1994 | Minami | B27D 1/10 144/397 |
| 6,047,622 A * | 4/2000 | Tracy | B27D 1/10 83/418 |

(Continued)

FOREIGN PATENT DOCUMENTS

| | | | |
|---|---|---|---|
| JP | S44-024239 | Y1 | 10/1969 |
| JP | 2009-73202 | A | 4/2009 |
| JP | 2018-001621 | A | 1/2018 |

OTHER PUBLICATIONS

International Search Report issued in PCT/JP2022/005248; mailed May 17, 2022.

*Primary Examiner* — Matthew Katcoff
(74) *Attorney, Agent, or Firm* — Studebaker Brackett PLLC

(57) ABSTRACT

Supporting tables 8, 9 for supporting both edges 90*a*, 90*b* of a veneer 90 are arranged when both edges 90*a*, 90*b* are scarfed using circular saws 40*a*, 41*a*. Supporting tables 8, 9 include pressing units 56, 57 for pressing both edges 90*a*, 90*b*, circular saw contacting sections 54, 55 for receiving the circular saws 40*a*, 41*a*, and auxiliary conveyors 60, 62 for transporting both edges 90*a*, 90*b* in a transporting direction TD. Pressing units 56, 57 are configured to press both edges 90*a*, 90*b* against at least the auxiliary conveyors 60, 62. Auxiliary conveyors 60, 62 are arranged adjacent to the circular saw contacting sections 54, 55. Both edges 90*a*, 90*b* transported in the transporting direction TD are pressed by the pressing units 56, 57, reducing a friction acting on both edges 90*a*, 90*b* in the direction opposite to the transporting direction TD.

11 Claims, 25 Drawing Sheets

(56) References Cited

U.S. PATENT DOCUMENTS

| | | | | |
|---|---|---|---|---|
| 6,089,297 | A * | 7/2000 | Shibagaki ................ | B27D 1/10<br>156/509 |
| 6,112,786 | A | 9/2000 | Otsuka et al. | |

* cited by examiner

SCARFING MACHINE

BACKGROUND

Field of the Invention

The present invention relates to a scarfing machine for machining a scarf face on a first edge of a veneer while transporting the veneer, the first edge located in the fiber direction of the veneer.

Description of the Related Art

Japanese Patent Application Laid-Open No. 2009-73202 (Patent Document 1) discloses a scarfing machine. The scarfing machine includes supporting tables each having a support surface for supporting both edges of a veneer in the fiber direction, circular saws disposed in the vicinity of both edges of the veneer for machining a scarf face on the edges of the veneer, and pressing units disposed in the vicinity of the contact portions where the circular saws and the veneer first come into contact for pressing the veneer against the support surfaces.

In the scarfing machine, both edges of a veneer are pressed against the support surfaces by the pressing unit in the vicinity of the contact portions where the circular saws and the veneer first come into contact. That is, both edges of a veneer are scarfed with any deflection such as twist and curve being straightened, and thereby good scarf faces can be achieved.

CITATION LIST

[Patent Literature] Japanese Patent Application Laid-Open No. 2009-73202

SUMMARY

Technical Problems

From the perspective of improving productivity, a scarfing machine has been proposed that machines scarf faces on both edges of a veneer while transporting the veneer. In the scarfing machine as well, in order to achieve good scarf faces, it is possible to install a pressing unit as in the scarfing machine described in the above-mentioned publication. However, in such a scarfing machine for machining the scarf faces on both edges of a veneer while transporting the veneer, a frictional force acts, in the direction opposite to the transport direction, on the portions between both edges of the veneer and the pressing unit and between both edges of the veneer and the supporting surface. As a result, for example, if both edges of the veneer have cracks or crevices, there is a risk that the resulting scarf faces are not good enough. In other words, the frictional force generated between both edges of the veneer and the pressing unit and between both edges of the veneer and the supporting surface acts in the direction of widening the cracks and crevices on both edges of the veneer, thereby causing the scarf faces to be damaged. Sometimes, both edges of the veneer are machined with the cracks and crevices widened, which eventually generates scarf face unmachined portions. When the widened cracks and crevices return to their original state due to the elasticity of the veneer, the resulting scarf faces may have steps therein. These risks mean there is still room for improvement in terms of both improving productivity and achieving a well-machined scarf face.

The claimed invention was made in view of the above issues, and one objective of the claimed invention is to provide a technique that contributes to improvement in both productivity and achieving of well-machined scarf faces.

Solution to Problems

A scarfing machine according to the claimed invention has adopted the following means for achieving the above objective.

A preferred embodiment of a scarfing machine according to the claimed invention is configured to machine a scarf face on a first edge of a veneer in the fiber direction of the veneer while transporting the veneer. The scarfing machine includes a frame, a holding-transporting unit disposed on the frame to be movable in the transporting direction, a machining unit having a cutter for machining a scarf face, a first-edge transport unit including a mount section for mounting the first edge at least at a contact position where the first edge and the cutter first come into contact, and a pressing unit disposed at least partially inside of a projection area of the mount section on a second virtual projection plane when viewed from one side in the vertical direction. The holding-transporting unit includes a holding unit for holding the veneer such that the first edge protrudes and also the protruding first edge is extending in the transporting direction of the veneer. The machining unit is placed intermediate of a transport path of the veneer such that a projection of the first edge intersects with a projection of the cutter on a first virtual projection plane when viewed from one side of the transport direction. The first-edge transport unit is configured for transporting the first edge in the transport direction at least at the contact position and a pressing position that is upstream of and adjacent to the contact position in the transport direction. The pressing unit is configured for pressing the first edge toward the mount section at the pressing position.

Here, the "contact position" in the claimed invention typically corresponds to a position of a virtual straight line orthogonal to the transporting direction. The virtual straight line also passes through the intersection of the first edge's projection and the cutter's projection on a virtual projection plane when the first contact state of the first edge of the veneer and the cutter is viewed from one side of the vertical direction. The "pressing position adjacent to the contact position" in the claimed invention preferably encompasses the contact position itself and the positions separated from the contact position by a predetermined distance. Here, the predetermined distance is desirably shorter to the contact position, but is a concept that accepts, for example, a distance equal to or less than half the length of a veneer in the transport direction. Note that the aspect where the pressing position is separated from the contact position by a predetermined distance preferably encompasses the aspects where a third object (e.g., a cover) is disposed between the pressing position and the contact position.

According to the claimed invention, the first edge of a veneer where a scarf face is machined is transported by the first-edge transport unit in the direction identical to the transport direction of the veneer. As a result, the frictional force acting on the first edge in the direction opposite to the transport direction can be reduced, the frictional force being caused by pressing of the first edge by the pressing unit. This configuration makes it possible, when the first edge has some cracks or crevices, to reduce the moment occurring in the direction of widening the cracks or crevices caused by the above-described frictional force, or in the direction of excessively closing the cracks or crevices. Hence, it is possible to well decrease any defects in the resulting scarf face, generation of unmachined scarf face portions that is caused by machining of the widened cracks or crevices, or steps in the resulting scarf face that are caused by the returning (opening) of the cracks or crevices due to the elasticity of the veneer after scarfing has been conducted with the cracks or crevices being excessively closed.

Note that when the dimension of a veneer along the fiber direction is changed (here, the dimension corresponds to the dimension of the veneer orthogonal to both the transport direction and the plate thickness direction of the veneer), the amount of protrusion of the first edge from the holding unit changes. When the amount of protrusion increases, in the traditional scarfing machines, that is, in the scarfing machines without the first-edge transport unit, the machining unit and the pressing unit need to be arranged in a direction away from the holding unit (direction of the protrusion) based on the increased amount of protrusion of the first edge. However, if the distances increase between the machining unit and the pressing unit and the holding unit, more specifically, the distances from the holding unit to the machining unit and the pressing unit (the distances in the direction orthogonal to both the transport direction and the plate thickness direction of the veneer) increase, the above-mentioned moment increases. Thus, it is necessary to change the placement of the holding unit so that the distances from the holding unit to the machining unit and the pressing unit are maintained at a predetermined distance or less. As a result, more improvement of the scarfing machine is required. According to the claimed invention, since the above-mentioned moment can be reduced, the distance from the holding unit to the machining unit and the pressing unit (the distance in the direction orthogonal to both the transport direction and the plate thickness direction of the veneer) is not required to maintain at a predetermined value or less: instead, only rearrangement of the machining unit and pressing unit is necessary. Hence, required improvement of the scarfing machine can be limited from increasing.

Furthermore, since the first edge can be pressed toward the mount section by the pressing unit, machining of a scarf face can be conducted while correcting any deflection such as twist and curve of the first edge. Since the scarf face is machined on the first edge while the veneer is transported, the productivity can be improved compared to a configuration in which the scarf face is machined on the first edge while the transport of the veneer is temporarily stopped.

According to another embodiment of the scarfing machine of the claimed invention, the first-edge transport unit is a conveyor having an endless belt as the mount section. The endless belt includes a first surface for mounting the first edge, and a second surface opposite to the first surface. The first edge includes a third surface that is able to contact the first surface, and a fourth surface opposite to the third surface. The pressing unit includes a first contact section that is configured for contacting the fourth surface and disposed opposite to the first surface. A first distance from a projection of the first contact section of the pressing unit in a pressable state on the first virtual projection plane to a projection of the first surface on the first virtual projection plane is less than or equal to a plate thickness of the first edge.

According to the present embodiment, the first edge can be reliably pressed against the endless belt by the pressing unit. This allows the first edge to be reliably transported in the transport direction, and thereby the occurrence of scarf face defects, generation of unmachined scarf face portions, and generation of steps in the scarf face can be more reliably reduced.

According to another embodiment of the scarfing machine of the claimed invention, the first-edge transport unit further includes a supporting section for supporting the first edge at least at the contact position. The supporting section is disposed at a position adjacent to the first-edge transport unit and opposite to the holding unit with respect to the first-edge transport unit when viewed from one side of the transport direction. The pressing unit further includes a second contact section configured for contacting the fourth surface. The supporting section includes a third contact section disposed opposite to the second contact section and configured for contacting the third surface. A second distance from a projection of the second contact section of the pressing unit in a pressable state on the first virtual projection plane to a projection of the third contact section on the first virtual projection plane is less than or equal to a plate thickness of the first edge. The "position adjacent to the first-edge transport unit" in the claimed invention preferably encompasses a position that is in contact with the first-edge transport unit, as well as positions separated from the first-edge transport unit by a predetermined distance. Here, the predetermined distance is desirably shorter to the first-edge transport unit. For example, the distance between the first-edge transport unit and the supporting section is set to be smaller than the distance between the first-edge transport unit and the holding unit. Note that the aspect where the first-edge transport unit is separated from the supporting section by a predetermined distance preferably encompasses the aspects where a third object (e.g., a cover) is disposed between the first-edge transport unit and the supporting section.

According to the present embodiment, the first edge can be reliably pressed against the endless belt by the pressing unit, and the first edge can be reliably pressed against the supporting section by the pressing unit. This allows the first edge to be reliably transported in the transport direction, and thereby the occurrence of scarf face defects, generation of unmachined scarf face portions, and generation of steps in the scarf face can be more reliably reduced. At the same time, scarfing is achieved while correcting any deflection such as twist and curve of the first edge.

According to another embodiment of the scarfing machine of the claimed invention, the conveyor includes a first pulley around which the endless belt is wound, and a motor connected to the first pulley for rotating the first pulley. The first pulley is configured for contacting the first surface. The coefficient of friction between the first pulley and the first surface is greater than the coefficient of friction between the first pulley and the second surface.

According to the present embodiment, the rotational driving force of the first pulley can be reliably transmitted by the endless belt. Thereby, the performance to transport the first edge in the transport direction can be improved.

According to another embodiment of the scarfing machine of the claimed invention, the pressing unit includes a first pressing section having the first contact section and a second pressing section having the second contact section.

According to the present embodiment, the first edge can be reliably pressed against the endless belt by the first pressing section. This allows the first edge to be reliably transported in the transport direction, and thereby the occurrence of scarf face defects, generation of unmachined scarf face portions, and generation of steps in the scarf face can be more reliably reduced. In addition, the second pressing section makes it possible to reliably press the first edge against the supporting section. This allows scarfing to be conducted on the first edge in a stable state, ensuring a well-machined scarf face.

According to another embodiment of the scarfing machine of the claimed inventio n, the scarfing machine further includes a supporting unit. The supporting unit is disposed at a position adjacent to the first-edge transport unit and opposite to the holding unit with respect to the first-edge transport unit when viewed from one side of the transport direction, for supporting the first edge at least at the contact position. The first-edge transport unit includes a disc body having an outer peripheral surface as the mount section, and a driving section for rotating the disc body. The first edge includes a fifth surface that is able to come into contact with the outer peripheral surface, and a sixth surface opposite to the fifth surface. The pressing unit further has a fourth and a fifth contact section for contacting the sixth surface. The supporting unit includes a sixth contact section configured to come into contact with the fifth surface. The fourth contact section is arranged to face the outer peripheral surface. The fifth contact section is arranged to face the supporting unit. A third distance from a project ion of the fourth contact section of the pressing unit in a pressable state on the first virtual projection plane to a projection of the outer peripheral surface on the first virtual projection plane is equal to or less than a plate thickness of the first edge. A fourth distance from a projection of the fifth contact section of the pressing unit in a pressable state on the first virtual projection plane to a projection of the sixth contact section on the first virtual projection plane is less than or equal to a plate thickness of the first edge. The "position adjacent to the first-edge transport unit" of the claimed invention preferably encompasses a position in contact with the first-edge transport unit, as well as positions separated from the first-edge transport unit by a predetermined distance. Here, the predetermined distance is desirably short er to the first-edge transport unit. For example, the distance between the first-edge transport unit and the supporting unit is set to be smaller than the distance between the first-edge transport unit and the holding unit. Note that the aspect where the first-edge transport unit is separated from the supporting unit by a predetermined distance preferably encompasses the aspects where a third object is disposed between the first-edge transport unit and the supporting unit.

According to the present embodiment, the first edge can be reliably pressed against the outer peripheral surface of the disc body by the pressing unit. This allows the first edge to be reliably transported in the transport direction, and thereby the occurrence of scarf face defects, generation of unmachined scarf face portions, and generation of steps in the scarf face can be more reliably reduced. In addition, the pressing unit makes it possible to reliably press the first edge against the supporting unit. This allows scarfing to be conducted on the first edge while correcting any deflection such as twist and curve of the first edge.

According to another embodiment of the scarfing machine of the claimed invention, the outer peripheral surface of the disc body has concave and convex parts.

According to the present embodiment, compared to a disc body with no concave and convex parts on the outer peripheral surface, the disc body with concave and convex parts on the outer peripheral surface has a larger frictional force occurring between the outer peripheral surface of the disc body and the first edge when the disc body rotates. Thus, the first edge can be reliably transported in the transport direction. As a result, the occurrence of scarf face defects, generation of unmachined scarf face portions, and generation of steps in the scarf face can be more reliably reduced. Here, the "frictional force" includes piercing.

According to another embodiment of the scarfing machine of the claimed invention, the scarfing machine further includes a control unit for controlling the holding-transporting unit and the first-edge transport unit. The control unit is configured to determine a transport speed of the first edge at which the first edge is transported by the first-edge transport unit based on a moving speed of the holding-transporting unit in the transport direction, and also to control the first-edge transport unit such that the first edge is transported at the determined transport speed.

According to the present embodiment, the transport speed at which the first-edge transport unit transports the first edge of a veneer in the transport direction can be set to a speed determined based on the transport speed at which the holding transport unit transports the veneer in the transport direction. This makes it possible to more effectively reduce the moment acting in the direction of widening the cracks or crevices of the first edge.

According to another embodiment of the scarfing machine of the claimed invention, the control unit is configured to control the first-edge transport unit such that the transport speed of the first edge by the first-edge transport unit is lower than the transport speed of the veneer by the holding-transporting unit until the first edge reaches the contact position.

According to the present embodiment, the transport speed of the first edge by the first-edge transport unit is lower than the transport speed of the veneer by the holding-transporting unit. Thus, until the first edge reaches the contact position, the first edge is subjected to a frictional force in a direction opposite to the transport direction. The frictional force acts in the direction of closing the cracks or crevices when there are cracks or crevices on the downstream side of the first edge in the transport direction. As such, it is possible to reduce the generation of unmachined scarf face portions that is caused by machining of the cracks or crevices in a widened state. As a result, even if the first edge has cracks or crevices on the downstream side thereof in the transport direction, scarfing can be conducted satisfactorily.

According to another embodiment of the scarfing machine of the claimed invention, the control unit is configured to control the first-edge transport unit such that the transport speed of the first edge by the first-edge transport unit is greater than the transport speed of the veneer by the holding-transporting unit after the first edge has reached the contact position.

According to the present embodiment, after the first edge has reached the contact position, the transport speed of the first edge by the first-edge transport unit excesses the transport speed of the veneer by the holding-transporting unit. Thus, the first edge is subjected to a frictional force in the direction identical to the transport direction. The frictional force acts in the direction of closing the cracks or crevices when there are cracks or crevices on the upstream side of the first edge in the transport direction. Accordingly, generation of unmachined scarf face portions, which occurs when scarfing is conducted with the cracks or crevices being widened in the first edge, can be reduced. As a result, even if there are cracks or crevices on the upstream side of the first edge in the transport direction, scarfing can be conducted satisfactorily.

According to another embodiment of the scarfing machine of the claimed invention, the control unit is configured to control the first-edge transport unit such that the transport speed of the first edge by the first-edge transport unit is equal to the transport speed of the veneer by the holding-transporting unit.

According to the present embodiment, even if the first edge has cracks or crevices, the frictional force caused by the transport surface can be limited from acting excessively in the direction of closing or widening the cracks or crevices. This can well reduce any scarf face defects, any unmachined scarf face portions that occur when scarfing is conducted with the cracks or crevices being widened, and/or any steps in the scarf face that occur when the cracks or crevices return to their original (open) state due to the elasticity of the veneer after scarfing has been conducted with the cracks or crevices being closed. As a result, even if the first edge has cracks or crevices, scarfing can be conducted satisfactorily.

Advantageous Effects of Invention

According to the claimed invention, a scarfing device can be provided that contributes to both improvement in productivity and achievement of a well-machined scarf face.

DETAILED DESCRIPTION

Next, the best mode for carrying out the present invention will be described using examples.

Example 11

Figure 1:
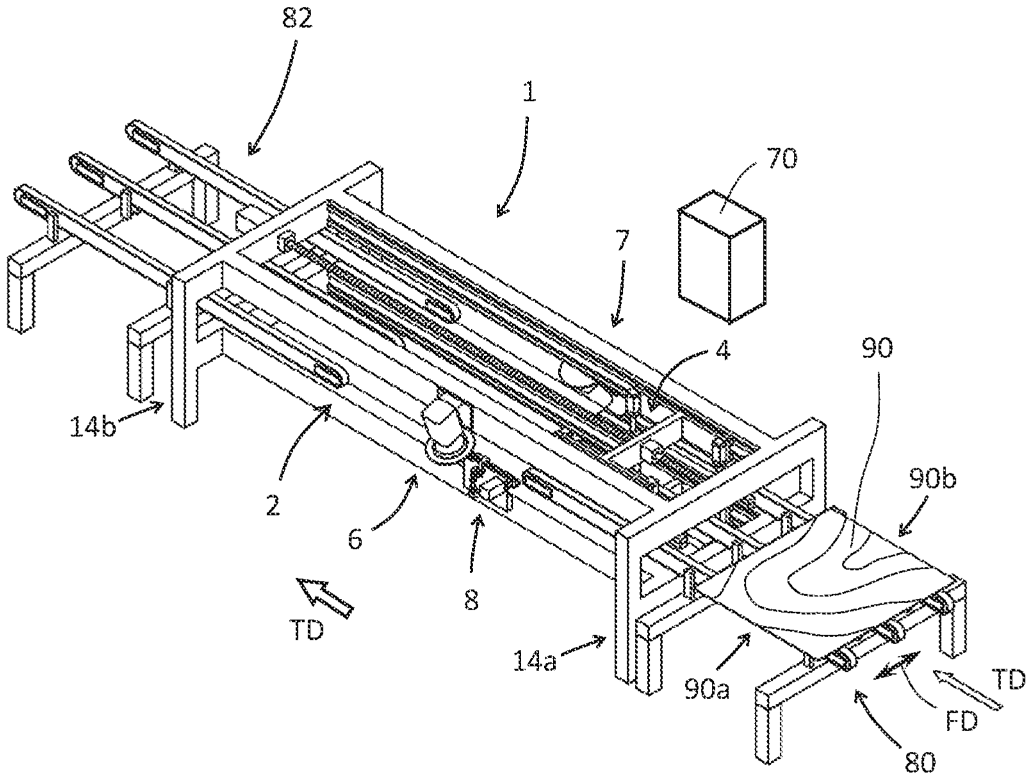
FIG. 1 is a configuration diagram schematically showing a configuration of a scarf processing system including a scarfing machine 1 according to an embodiment.
Figure 2:
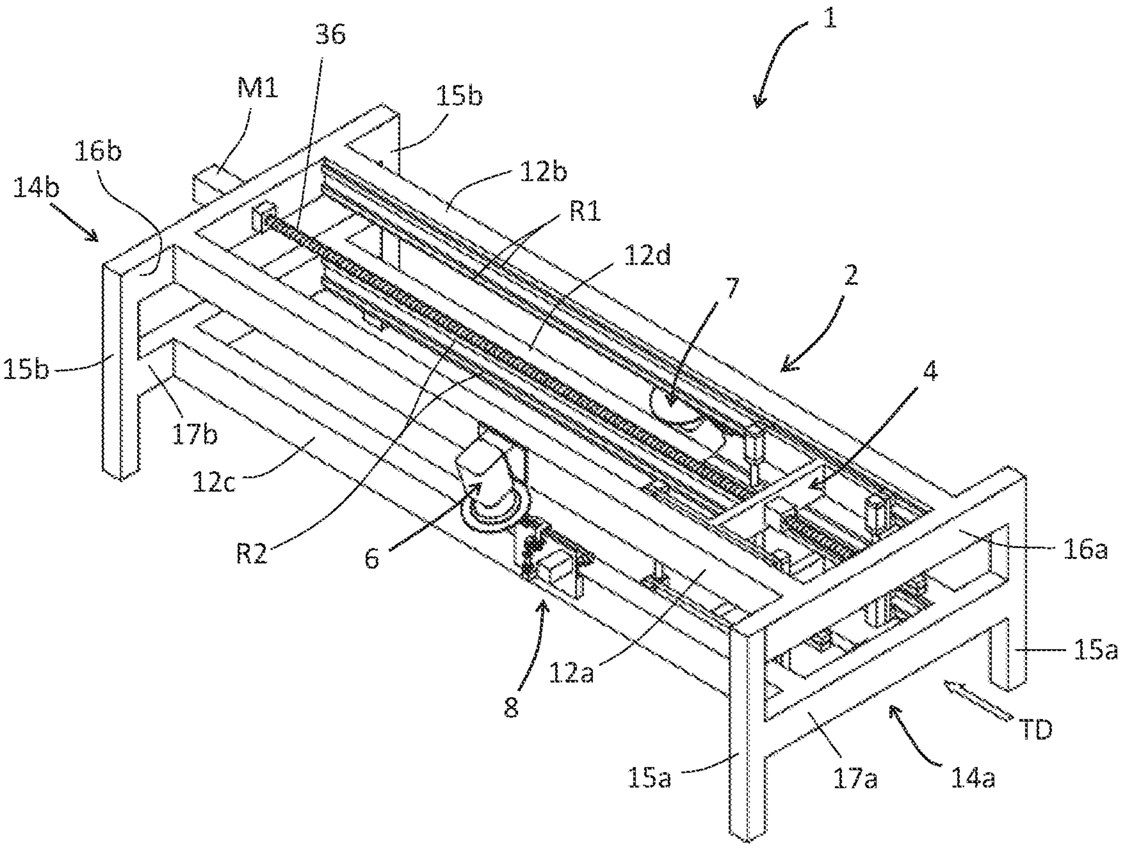
FIG. 2 is a configuration diagram schematically showing a configuration of the scarfing machine 1 according to an embodiment.
Figure 3:
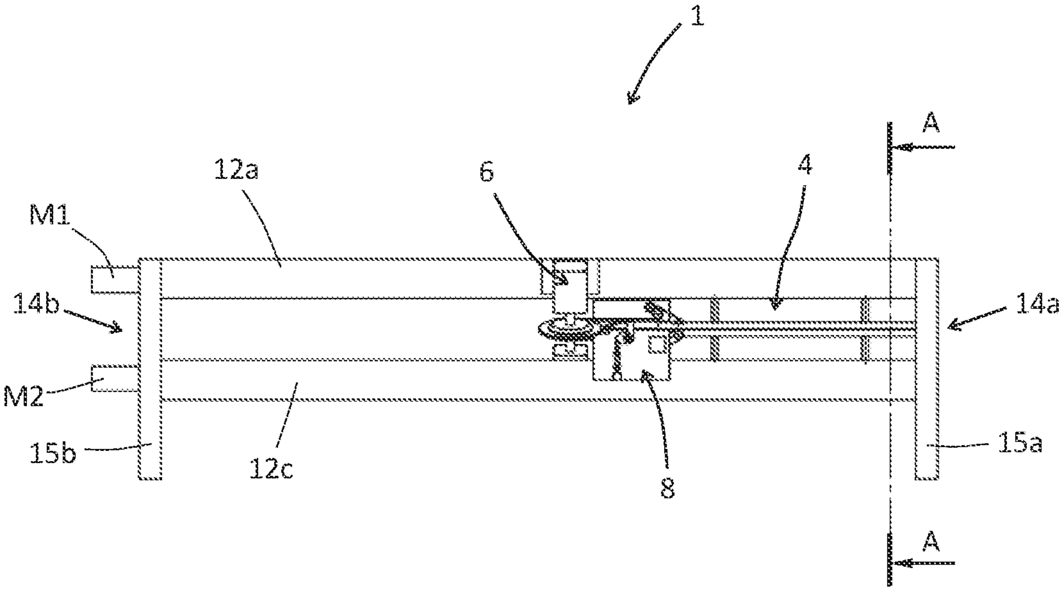
FIG. 3 is a side view of the scarfing machine 1 according to an embodiment viewed from the side perpendicular to the longitudinal direction.
Figure 4:
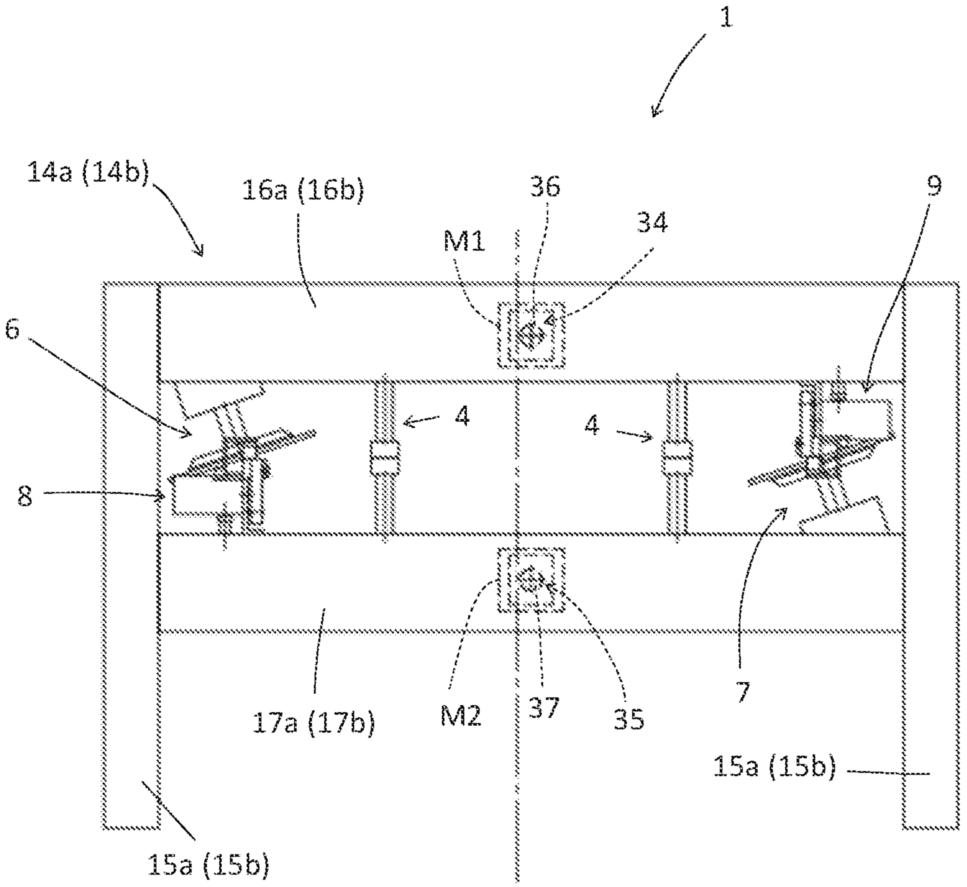
FIG. 4 is a front view of the scarfing machine 1 according to an embodiment viewed from one side in the longitudinal direction.

As shown in FIG. 1, a scarfing machine 1 according to an embodiment of the claimed invention is configured to machine a scarf face onto both edges 90*a*, 90*b* in the fiber direction FD of a veneer 90 that is transported by a carry-in conveyor 80, and to transport the veneer 90 having the machined scarf faces to a carry-out conveyor 82. As shown in FIGS. 2 to 4, the scarfing machine 1 includes a frame 2 having a longitudinal direction, a clamping-transporting unit 4 disposed on the frame 2 so as to be movable in the longitudinal direction of the frame 2, a pair of machining units 6, 7 located intermediate of the longitudinal direction of the frame 2, a pair of supporting tables 8, 9 in the vicinity of the pair of machining units 6, 7 (the supporting table 9 is shown in FIG. 4), and a control device for controlling the entire scarfing machine 1. Both edges 90*a*, 90*b* correspond to the “first edge” of the claimed invention, and the intermediate of the longitudinal direction of the frame 2 is an example configuration corresponding to the “intermediate of a transport path of the veneer.”

As shown in FIG. 1, the frame 2 has a longitudinal direction along the transport direction TD in which a veneer 90 is transported. As shown in FIG. 2, the frame 2 includes a pair of upper beams 12*a*, 12*b* and a pair of lower beams 12*c*, 12*d* both extending in the longitudinal direction, and base bodies 14_a_, 14_b_ connected to both edges of the pair of upper beams 12_a_, 12_b_ and the pair of lower beams 12_c_, 12_d_ in the longitudinal direction.

Figure 6:
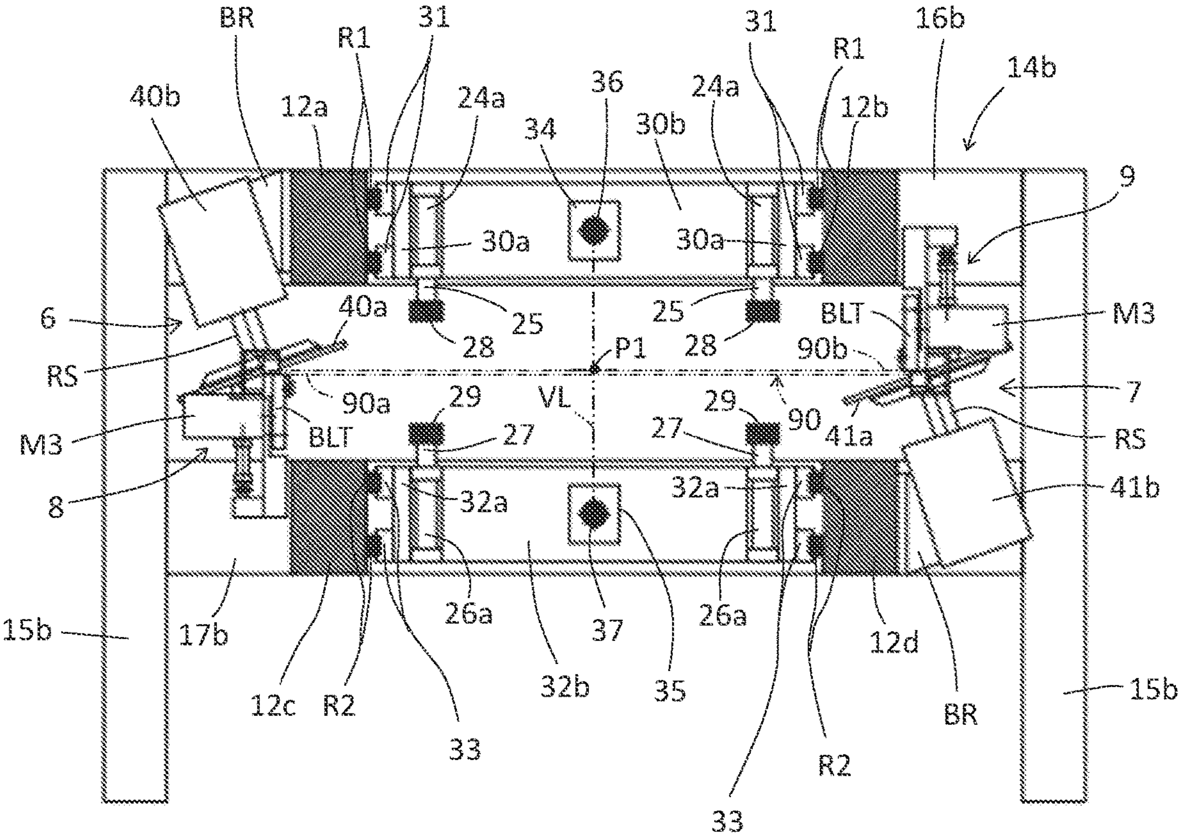
FIG. 6 is a cross-sectional view showing the A-A cross section in FIG. 3.

As shown in FIG. 6, a pair of upper and lower guide rails R1, R1 are respectively arranged on the inner surfaces of the pair of upper beams 12_a_, 12_b_ (the surfaces that face each other among the surfaces of the pair of upper beams 12_a_. 12_b_) (see FIG. 2). Similarly, a pair of upper and lower guide rails R2. R2 are respectively arranged on the inner surfaces of the pair of lower beams 12_c_, 12_d_ (the surfaces that face each other among the surfaces of the pair of lower beams 12_c_, 12_d_) (see FIG. 2). As shown in FIG. 2, the guide rails extend entirely along the upper beams 12_a_, 12_b_ and the lower beams 12_c_ and 12_d_ in the longitudinal direction.

The base bodies 14_a_, 14_b_ basically have the same shape. As shown in FIGS. 2 to 4, the base bodies 14_a_, 14_b_ respectively include a pair of legs 15_a_, 15_a_, 15_b_, 15_b_, upper beams 16_a_, 16_b_ and lower beams 17_a_, 17_b_ connected to the pair of legs 15_a_, 15_a_, 15_b_, 15_b_. In other words, the base bodies 14_a_, 14_b_ has a generally A shape when viewed from one side of the longitudinal direction. Note that the carry-in conveyor 80 is disposed on the base body 14_a_ side, and the carry-out conveyor 82 is disposed on the base body 14_b_ side.

Figure 5:
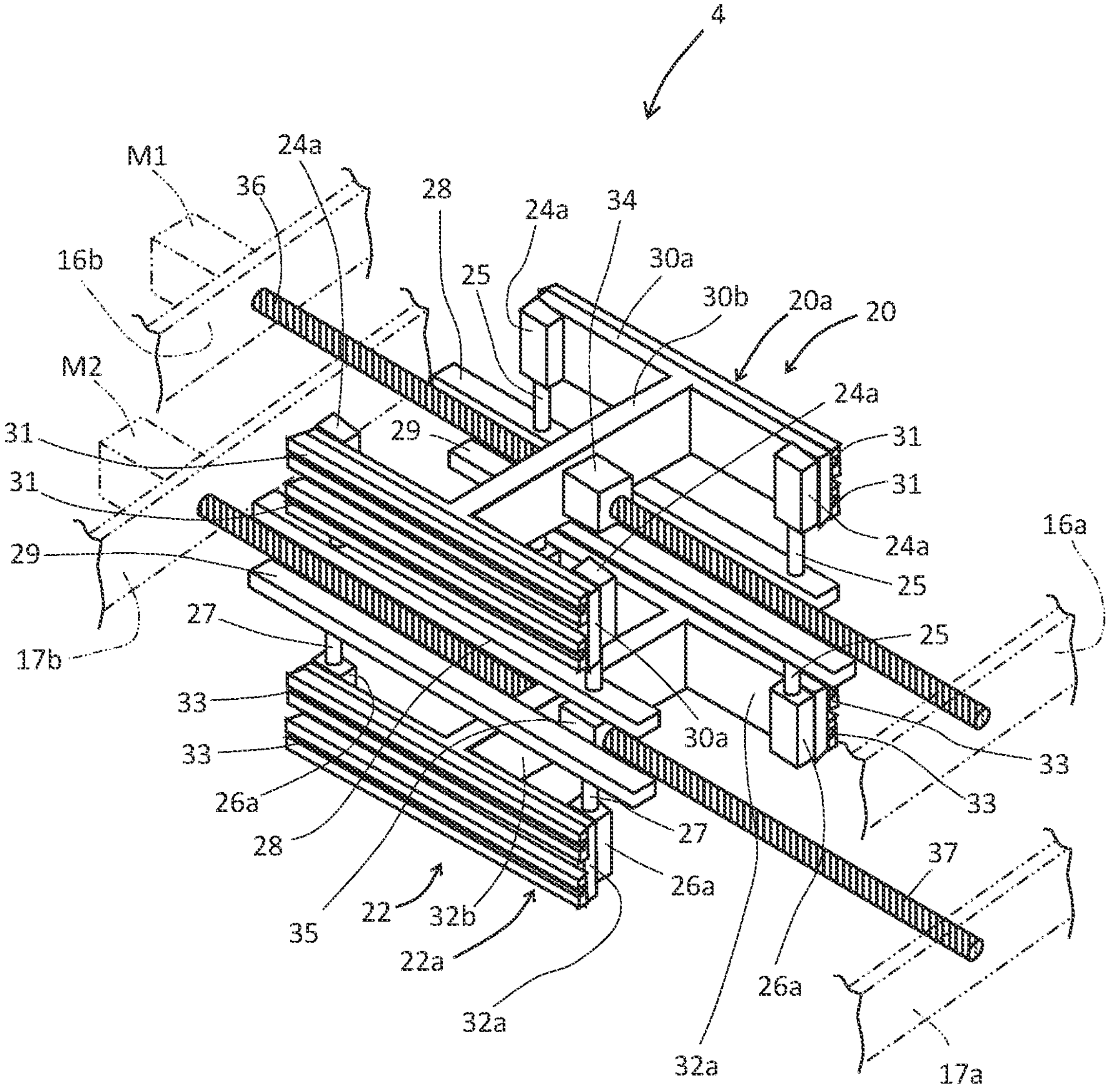
FIG. 5 is a perspective view schematically showing a configuration of a clamping-transporting unit 4.
Figure 7:
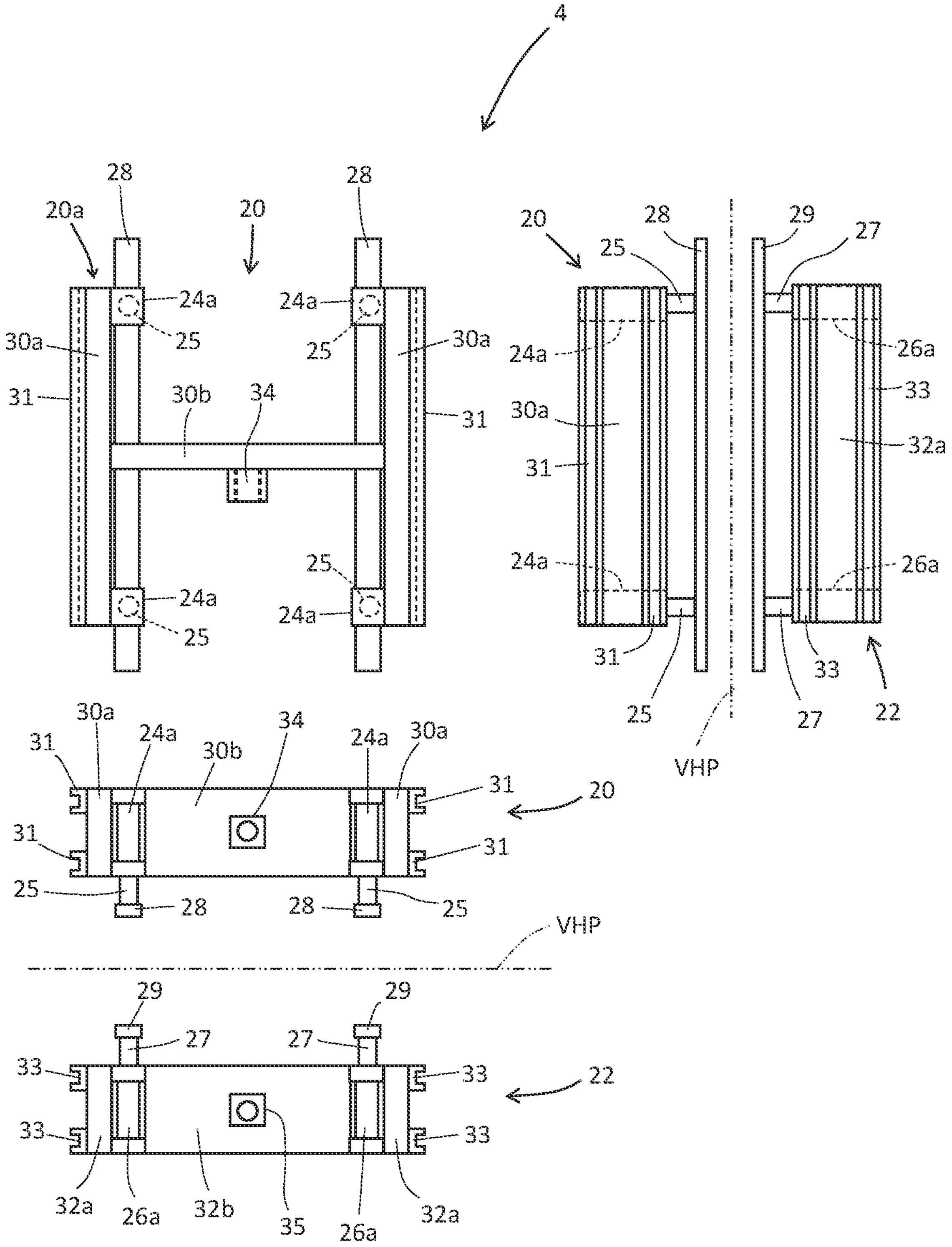
FIG. 7 is a three-sided view of the clamp and transport section 4.

As shown in FIGS. 5 to 7, the clamping-transporting unit 4 is configured with an upper-side clamper 20 and a lower-side clamper 22. The upper-side clamper 20 and the lower-side clamper 22 are basically identical to each other in configuration. The upper-side clamper 20 and the lower-side clamper 22 have bodies 20_a_, 22_a_ of generally H-shape in plan view, four air cylinders 24_a_, 24_a_, 24_a_, 24_a_, 26_a_. 26_a_, 26_a_, 26_a_ arranged in the bodies 20_a_, 22_a_, clamping bars 28, 28 fixed to the rods 25, 25, 25, 25 of the air cylinders 24_a_, 24_a_, 24_a_, 24_a_, and clamping bars 29, 29 fixed to the rods 27, 27, 27, 27 of the air cylinders 26_a_, 26_a_, 26_a_. 26_a_. The clamping-transporting unit 4 corresponds to the "holding-transporting unit" of the claimed invention, and the clamping bars 28, 29 are example configurations corresponding to the "holding unit" of the claimed invention.

As shown in FIGS. 5 to 7, the body 20_a_ and the body 22_a_ respectively includes a pair of the longitudinal pieces 30_a_. 30_a_ and a pair of longitudinal pieces 32_a_, 32_a_, and lateral pieces 30_b_ and 32_b_ connecting the longitudinal pieces 30_a_, 30_a_ and the longitudinal pieces 32_a_, 32_a_ at the approximately middle of the pair of the longitudinal pieces 30_a_, 30_a_ and the pair of longitudinal pieces 32_a_, 32_a_ in the longitudinal direction. The body 20_a_ and the body 22_a_ are generally H-shaped in plan view.

As shown in FIGS. 5 to 7, a pair of upper and lower guide portions 31, 31 is positioned on the outer surfaces of the pair of longitudinal pieces 30_a_, 30_a_ (the surfaces opposite to the surfaces where the lateral piece 30_b_ is connected). As shown in FIGS. 5 to 7, a pair of upper and lower guide portions 33, 33 is positioned on the outer surfaces of the pair of longitudinal pieces 32_a_, 32_a_ (the surfaces opposite to the surfaces where the lateral piece 32_b_ is connected). The guide portions 31, 31 and the guide portion 33, 33 are engageable with the guide rails R1, R1 and the guide rails R2. R2, as shown in FIG. 6. That is, the upper-side clamper 20 is slidably supported by the upper beam 12_a_, 12_b_ via the guide portions 31, 31 and the guide rails R1, R1, while the lower-side clamper 22 is slidably supported by the lower beam 12_c_, 12_d_ via the guide portions 33, 33 and the guide rails R2, R2. Note that the upper-side clamper 20 and the lower-side clamper 22 are placed symmetrically with respect to a virtual horizontal plane VHP (see FIG. 7).

As shown in FIGS. 5 to 7, female screws 34, 35 are fixed to the lateral piece 30_b_ and the lateral piece 32. The female screw 34 is threadedly engaged with a male threaded rod 36 that is rotatably supported by the upper beams 16_a_, 16_b_ of the base bodies 14_a_, 14_b_. The male threaded rod 36 is rotated by a motor M1 that is fixed to the upper beam 16_b_. The female screw 35 is threadedly engaged with a male threaded rod 37 that is rotatably supported by the upper beams 17_a_, 17_b_ of the base bodies 14_a_, 14_b_. The male threaded rod 37 is rotated by a motor M2 that is fixed to the upper beam 17_b_. That is, rotation of the male threaded rods 36, 37 forward and backward by the motors M1, M2 causes the upper-side clamper 20 and the lower-side clamper 22 to be reciprocated in the longitudinal direction of the upper beams 12_a_, 12_b_ and the lower beams 12_c_, 12_d_.

As shown in FIG. 7, the air cylinders 24_a_, 24_a_, 24_a_, 24_a_ are disposed on both edges of the longitudinal pieces 30_a_. 30_a_ in the longitudinal direction, that is, on the inner surfaces of the longitudinal pieces 30_a_, 30_a_ (the surfaces where the lateral piece 30_b_ is connected). Also, the air cylinders 26_a_, 26_a_, 26_a_, 26_a_ are disposed on both edges of the longitudinal pieces 32_a_, 32_a_ in the longitudinal direction, that is, on the inner surfaces of the longitudinal pieces 32_a_, 32_a_ (the surfaces where the lateral piece 32_b_ is connected). When the air cylinders 24_a_. 24_a_. 24_a_, 24_a_, 26_a_, 26_a_, 26_a_, 26_a_ are driven in the direction in which the rods 25, 25, 25, 25, 27, 27, 27, 27 protrude out, the clamping bars 28, 28 and the clamping bars 29, 29 approach each other. By the approaching, a veneer 90 is clamped between the clamping bars 28, 28 and the clamping bars 29, 29. In contrast, when the air cylinders 24_a_, 24_a_, 24_a_, 24_a_, 26_a_, 26_a_, 26_a_, 26_a_ are driven in the direction in which the rods 25, 25, 25, 25, 27, 27, 27, 27 retract, the clamping bars 28, 28 and the clamping bars 29, 29 separate from each other. By the separation, the clamp of the veneer 90 between the clamping bars 28, 28 and the clamping bars 29, 29 is released. Note that the clamping bars 28, 28 and the clamping bars 29, 29 clamp a veneer 90 with both edges 90_a_, 90_b_ of the veneer protruding out thereof.

As described above, the clamping-transporting unit 4 moves in the transport direction TD with a veneer 90, which has been carried in from the carry-in conveyor 80, being clamped between the clamping bars 28, 28 and the clamping bars 29, 29, so as to transport the veneer 90 to the carry-out conveyor 82.

As shown in FIG. 6, the machining units 6, 7 are basically identical to each other in configuration. The machining units 6, 7 include circular saws 40_a_, 41_a_ and motors 40_b_, 41_b_ having the rotational shafts RS, RS. The circular saws 40_a_. 41_a_ are connected to the motors 40_b_, 41_b_ via the rotational shafts RS, RS. The circular saws 40_a_. 41_a_ are an example configuration of the "cutter" of the claimed invention.

As shown in FIG. 6, the motor 40_b_ is fixed to the outer surface of the upper beam 12_a_ (the surface that faces opposite to the upper beam 12_b_ among the surfaces of the pair of upper beams 12_a_) via a bracket BR, while the motor 41_b_ is fixed to the outer surface of the lower beam 12_d_ (the surface that faces opposite to the lower beam 12_c_ among the surfaces of the pair of lower beams 12_d_) via a bracket BR, as shown in FIG. 6. That is, the machining units 6, 7 are arranged symmetrically with respect to the central point P1 of a virtual line VL connecting between the centers of the male threaded rods 36, 37 on a virtual projection plane w % ben viewed from one side of the longitudinal direction of the frame 2 (one side of the transport direction TD of a veneer 90), that is, when viewed from one side of the extension direction of both edges 90_a_, 90_b_ of a veneer 90 (the direction orthogonal to the paper of FIG. 6).

As shown in FIG. 6, the machining units 6, 7 are arranged in a positional relationship in which the projections of the circular saws 40*a*, 41*a* intersect with the projections of both edges 90*a*, 90*b* of a veneer 90 on the virtual projection plane (i.e., the projections of both edges 90*a*, 90*b* of a veneer 90 partially falls within the projections of the projections of the circular saws 40*a*. 41*a*).

Such machining units 6, 7 arranged as described above are configured to machine scarf faces that are parallel to each other on both edges 90*a*, 90*b* of a veneer 90. Note that the machining units 6, 7 are located at approximately middle of the frame 2 in the longitudinal direction, and configured to machine scarf faces onto both edges 90*a*, 90*b* of a veneer 90 while the veneer 90 is transported by the clamping-transporting unit 4 to the carry-out conveyor 82.

Figure 9:
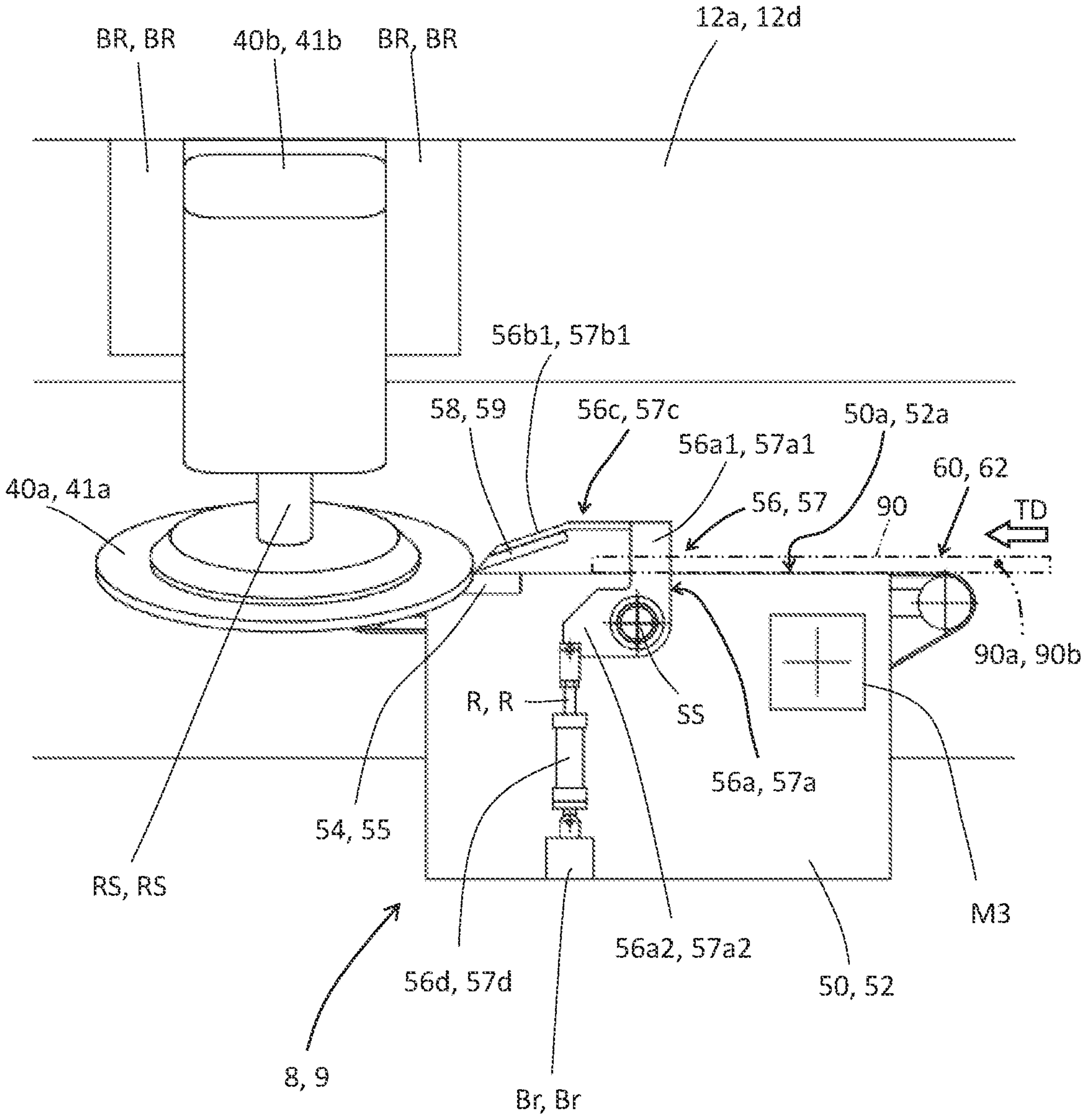
FIG. 9 is a configuration diagram schematically showing a configuration of machining units 6, 7 and supporting tables 8, 9.

As shown in FIG. 9, the supporting tables 8, 9 are identical to each other in configuration. The supporting tables 8, 9 include bases 50, 52, circular saw contacting sections 54, 55 that are integrated with the bases 50, 52, pressing units 56, 57 swingably supported on the bases 50, 52 via swing shafts SS, SS, and auxiliary conveyors 60, 62 supported by the bases 50, 52. The auxiliary conveyors 60, 62 are an example configuration corresponding to the "first-edge transport unit" and the "conveyor" of the claimed invention.

As shown in FIG. 9, the bases 52, 52 include mount surfaces 50*a* 52*a* for mounting both edges 90*a*, 90*b* of a veneer 90. On the mount surfaces 50*a* 52*a*, circular saw contacting sections 54, 55 which will be describer later are placed. The mount surfaces 50*a* 52*a* have a function to decrease the deflection of endless belts BLT, BLT, which will be describer later.

Figure 8:
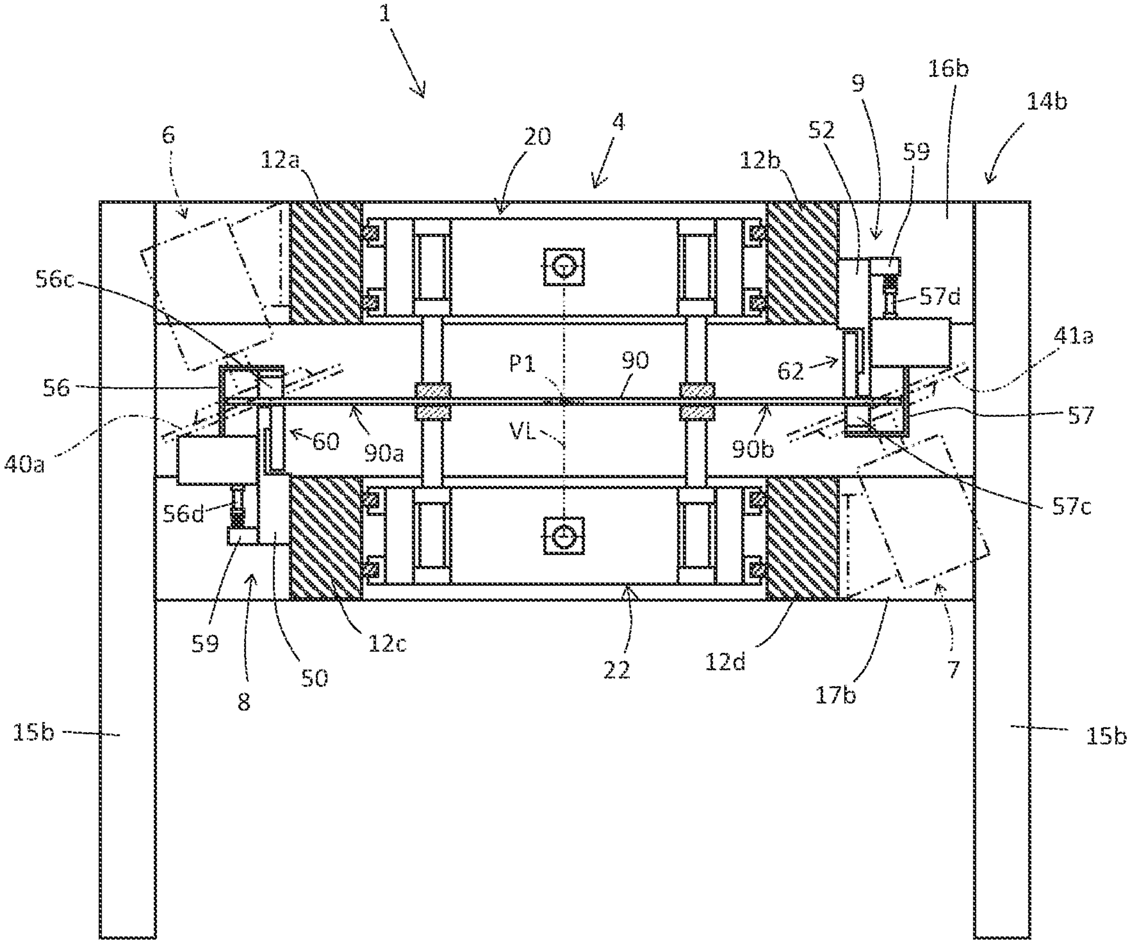
FIG. 8 is an explanatory diagram showing how a veneer 90 is clamped by clamping bars 28, 28, 29, 29.

As shown in FIG. 8, the base 50 is fixed to the outer surface of the lower beam 12*c* (the surface facing opposite to the lower beam 12*d* among the surfaces of the lower beam 12*c*), while the base 52 is fixed to the outer surface of the lower beam 12*b* (the surface facing opposite to the upper beam 12*a* among the surfaces of the upper beam 12*b*). That is, the supporting tables 8, 9 are arranged symmetrically with respect to the central point P1 on the virtual projection plane when viewed from one side of the longitudinal direction of the frame 2 (one side of the transport direction TD of a veneer 90), that is, when viewed from one side of the extension direction of both edges 90*a*, 90*b* of a veneer 90 (the direction orthogonal to the paper of FIG. 8).

Figure 10:
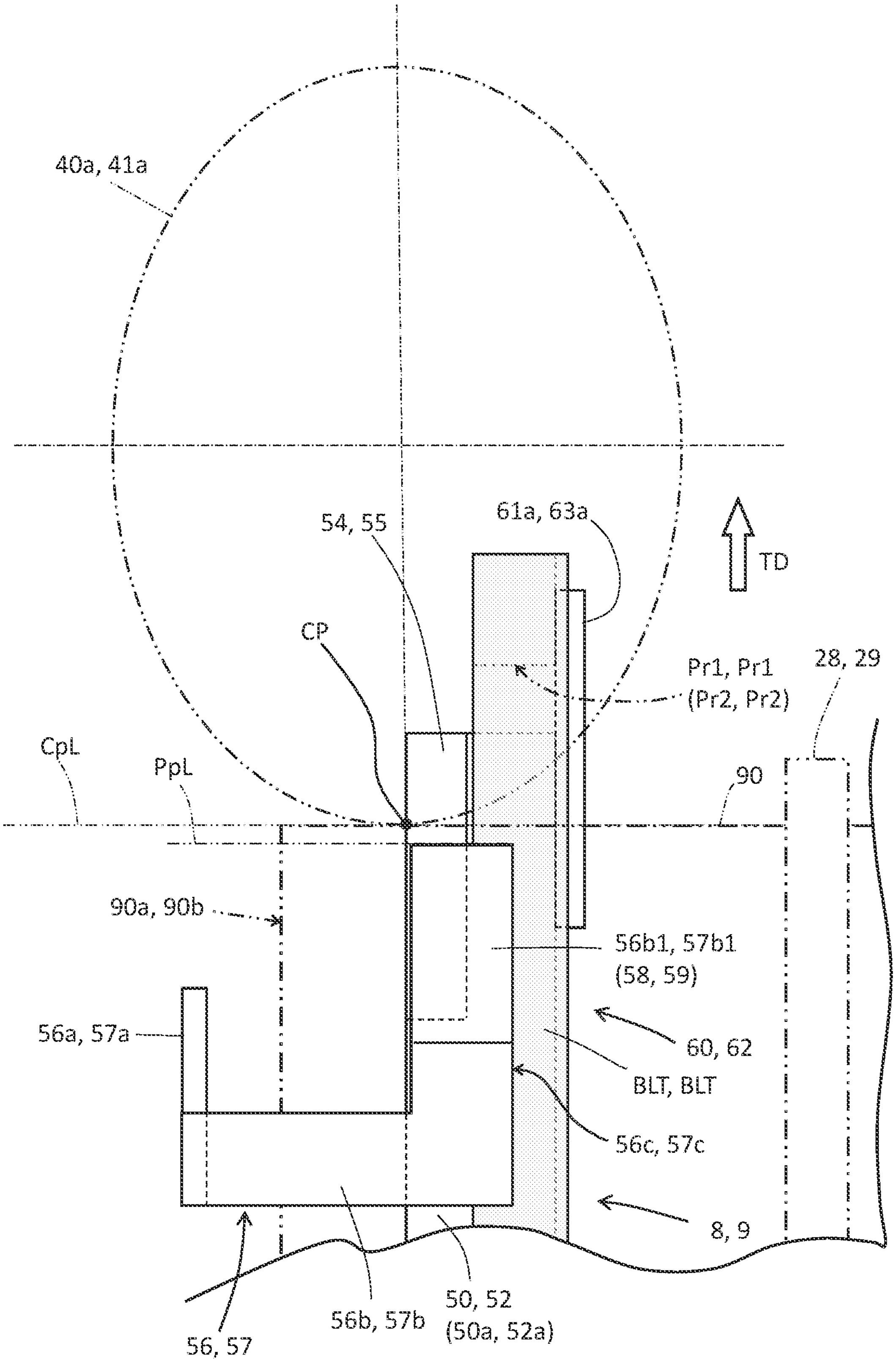
FIG. 10 is an explanatory diagram showing the positional relationship between pressing units 56, 57, circular saw contacting sections 54, 55, and endless belts BLT, BLT.
Figure 14:
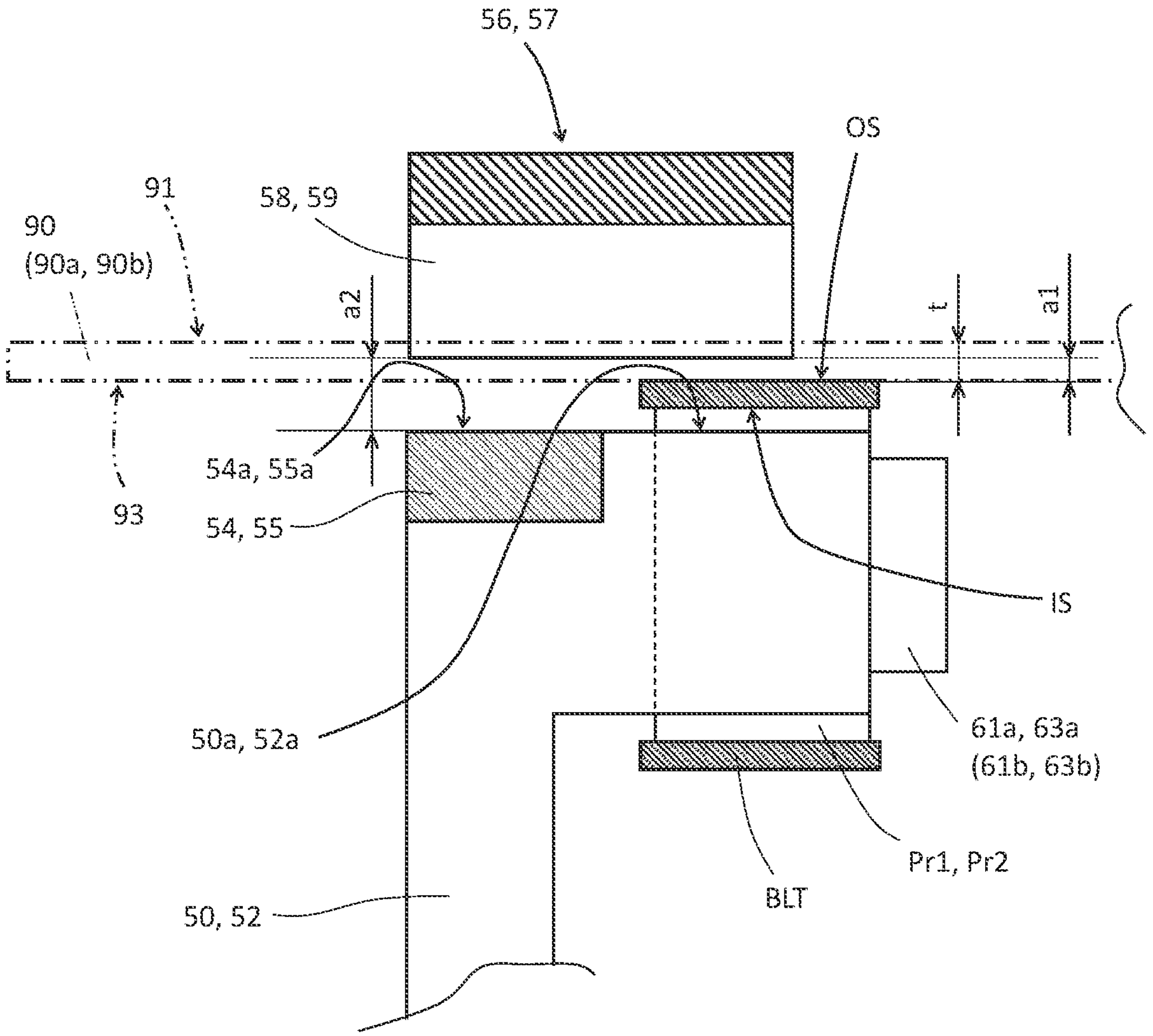
FIG. 14 is an explanatory diagram showing the positional relationship between contact sections 58, 59, the upper surfaces 54*a*. 55*a* of the circular saw contacting sections 54, 55, the outer surfaces OS, OS and the inner surfaces IS. IS of the endless belts BLT, BLT, mount surfaces 50*a*, 52*a*, and the upper surface 91 and the lower surface 93 of a veneer 90.

The circular saw contacting sections 54, 55 function to receive the circular saws while scarfing is being conducted on both edges 90*a*. 90*b* of a veneer 90, and are positioned on the mount surfaces 50*a*, 52*a* of the bases 50, 52 so as to contact the tips of the circular saws 40*a*, 41*a*, as shown in FIGS. 9 and 10. The circular saw contacting sections 54, 55 in the present embodiment have upper surfaces 54*a*, 55*a* (the surfaces opposite to the contact sections 58, 59, which will be described later) that are flash with the mount surfaces 50*a*, 52*a*, as shown in FIG. 14. Preferably, the circular saw contacting sections 54, 55 are comprised of synthetic resin or wood. Note that the tips of the circular saws 40*a*, 41*a* contact both edges 90*a*. 90*b* of a veneer 90 for the first time at the point CP where the projections of the tips of the circular saws 40*a*, 41*a* intersect with the projections of the circular saw contacting sections 54, 55 on the virtual projection plane when viewed from one side of the vertical direction (the direction orthogonal to the paper of FIG. 10). Hereinafter, a virtual straight line passing through the point CP and perpendicular to the transport direction TD will be referred to as a "contact position CpL." The bases 50, 52 and the circular saw contacting sections 54, 55 correspond to the "supporting unit" of the claimed invention, and the upper surfaces 54*a*, 55*a* are an example configuration corresponding to the "third contact section" of the claimed invention. The virtual projection plane when viewed from one side of the vertical direction (the direction orthogonal to the paper of FIG. 10) is an example configuration corresponding to the "second virtual projection plane" of the claimed invention.

The pressing units 56, 57 include: lever sections 56*a*, 57*a* (see FIG. 9) of generally inverted V shape when viewed from one side of the axial direction of the swing shafts SS, SS; contact sections 56*b*, 57*b* (see FIGS. 10 and 11) extending along the axial direction of the swing shafts SS, SS from the tips of first pieces 56*a*1, 57*a*1 of the lever sections 56*a*, 57*a*; pressing arm 56*c*, 57*c* (see FIGS. 9 and 10) extending in the same direction with the extension direction of second pieces 56*a*2, 57*a*2 of the lever sections 56*a*. 57*a* from the extending edges of the contact sections 56*b*, 57*b* (the edges opposite to the edges connected to the first pieces 56*a*1, 57*a*1), and air cylinders 56*d*, 57*d* (see FIG. 9) having rods R, R.

As shown in FIG. 9, the lever sections 56*a*, 57*a* are supported by the swing shafts SS, SS at the intersection between the first pieces 56*a*1, 57*a*1 and the second pieces 56*a*2, 57*a*2. Note that the swing shafts SS. SS are fixed to the bases 50, 52. As shown in FIG. 10, the pressing arm 56*c*, 57*c* are placed within the projection areas of the circular saw contacting sections 54, 55 and the projection areas of the endless belts BLT, BLT, which will be described later, on the virtual projection plane when viewed from one side of the vertical direction (the direction orthogonal to the paper of FIG. 10). In other words, the contact sections 56*b*, 57*b* have a length configured to place the pressing arm 56*c*, 57*c* above the circular saw contacting sections 54, 55 and the endless belts BLT. BLT.

As shown in FIG. 9, the pressing arms 56*c*. 57*c* extend horizontally from the extension edges of the contact sections 56*b*, 57*b* by a predetermined distance and then extend downward: that is, the pressing arm 56*c*, 57*c* have bending portions 56*b*1, 57*b*1. The bending portions 56*b*1, 57*bl* include contact sections 58, 59 that come in contact with both edges 90*a*, 90*b* of a veneer 90. The surfaces of the contact sections 58, 59 opposite to the circular saw contacting sections 54, 55 and the endless belts BLT, BLT incline toward the tips (the left side in FIG. 9) so as to gradually approach the circular saw contacting sections 54, 55 and the endless belts BLT, BLT. Note that the contact sections 58, 59 preferably are comprised of synthetic resin of a relatively low coefficient of friction. The surfaces of the contact sections 58, 59 opposite to the circular saw contacting sections 54, 55 and the endless belts BLT, BLT are an example configuration corresponding to the "second contact section" and the "first contact section" of the claimed invention.

As shown in FIGS. 9 and 10, the pressing arms 56*c*, 57*c* extend horizontally from the extension edges of the contact sections 56*b*, 57*b* by a predetermined distance and then extend downward: that is, the pressing arm 56*c*, 57*c* have bending portions 56*b*1, 57*b*1. The bending portions 56*b*1, 57*b*1 include contact sections 58, 59 that come in contact with both edges 90*a*, 90*b* of a veneer 90. The surfaces of the contact sections 58, 59 opposite to the circular saw contacting sections 54, 55 and the endless belts BLT, BLT incline toward the tips (the left side in FIG. 9) so as to gradually approach the circular saw contacting sections 54, 55 and the endless belts BLT, BLT. Note that the contact sections 58, 59 preferably are comprised of synthetic resin of a relatively low coefficient of friction. The surfaces of the contact sections 58, 59 opposite to the circular saw contacting sections 54, 55 and the endless belts BLT, BLT are an example configuration corresponding to the "second contact section" and the "first contact section" of the claimed invention.

Figure 12:
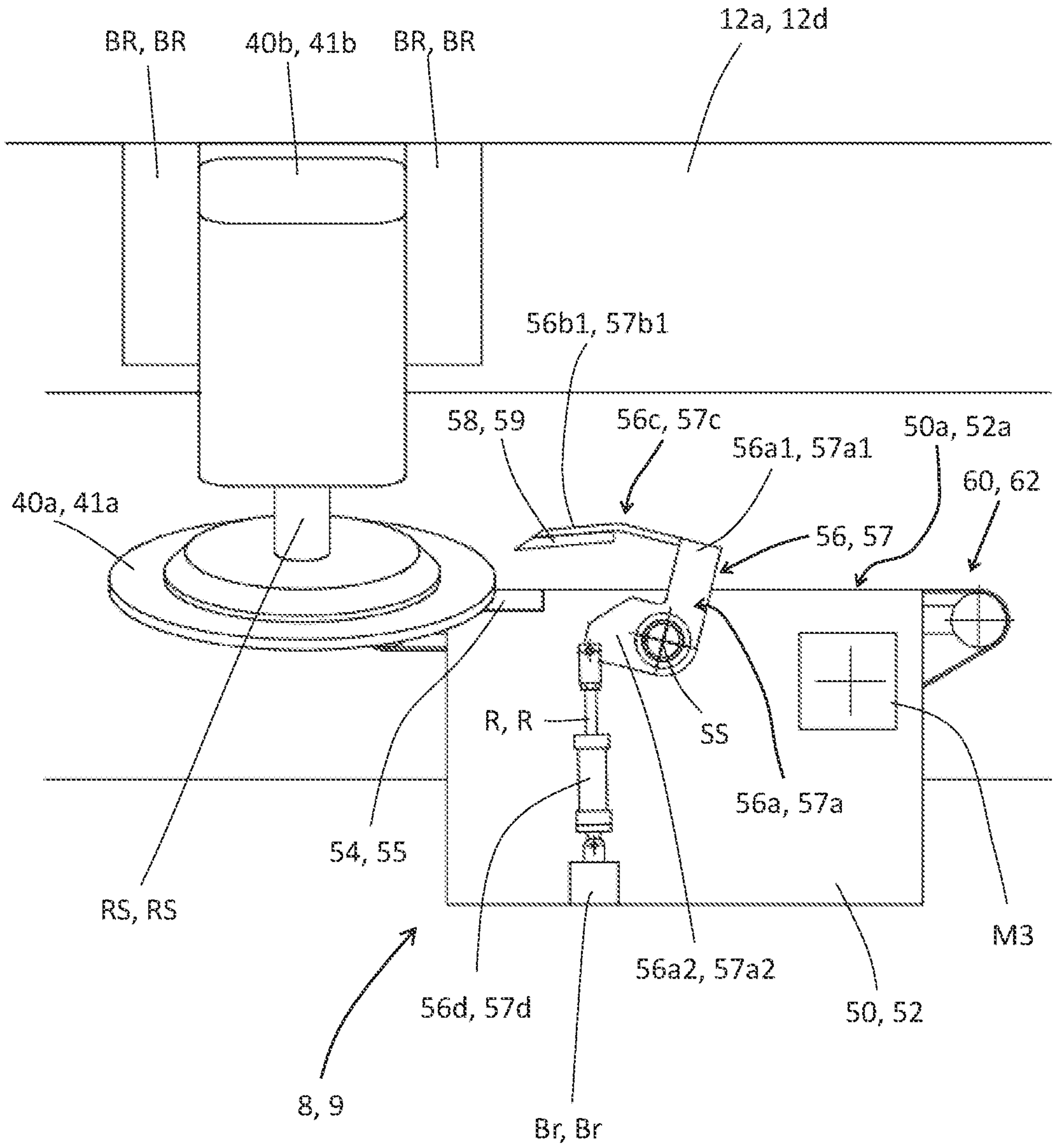
FIG. 12 is an explanatory diagram showing pressing units 56, 57 in a state not to press a veneer 90.

In contrast, when the air cylinders 56*d*, 57*d* are driven in the direction in which the rods R. R extend, the pressing units 56, 57 swing (rotate) clockwise around the swing shafts SS, SS (clockwise in FIG. 12). As a result, the pressing of both edges 90*a*, 90*b* of a veneer 90 by the pressing units 56, 57, more specifically by the contact sections 58, 59, is released.

As shown in FIG. 10, here, the contact sections 58, 59 are set to contact both edges 90*a*, 90*b* of a veneer 90 at a position upstream of the contact position CpL in the transport direction TD and also at a pressing position PpL adjacent to the contact position CpL. It is desirable that the contact position CpL and the pressing position PpL be arranged as close as possible.

The auxiliary conveyors 60, 62 are basically identical to each other in configuration. The auxiliary conveyors 60, 62 include four pulleys Pr1, Pr2, Pr3, Pr4, an endless belt BLT wound around the pulleys Pr1, Pr2, Pr3, Pr4, and a motor M3 having a rotational shaft (not shown) that is connected to the pulley Pr3. The endless belt BLT is an example configuration corresponding to the "mount section" of the claimed invention.

Figure 11:
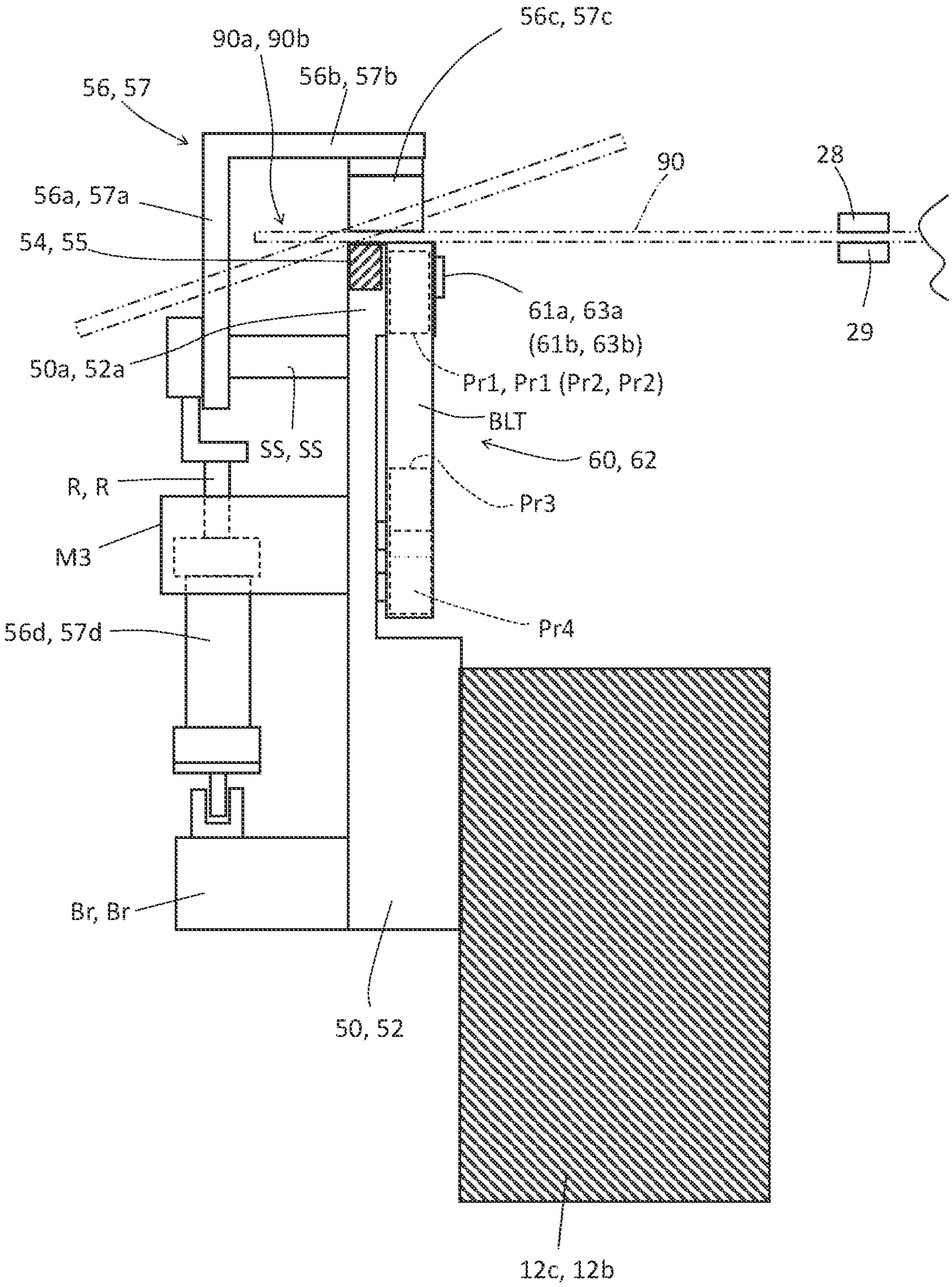
FIG. 11 is an explanatory diagram showing the positional relationship between the circular saw contacting sections 54, 55, auxiliary conveyors 60, 62, and clamping bar 28, 29.
Figure 13:
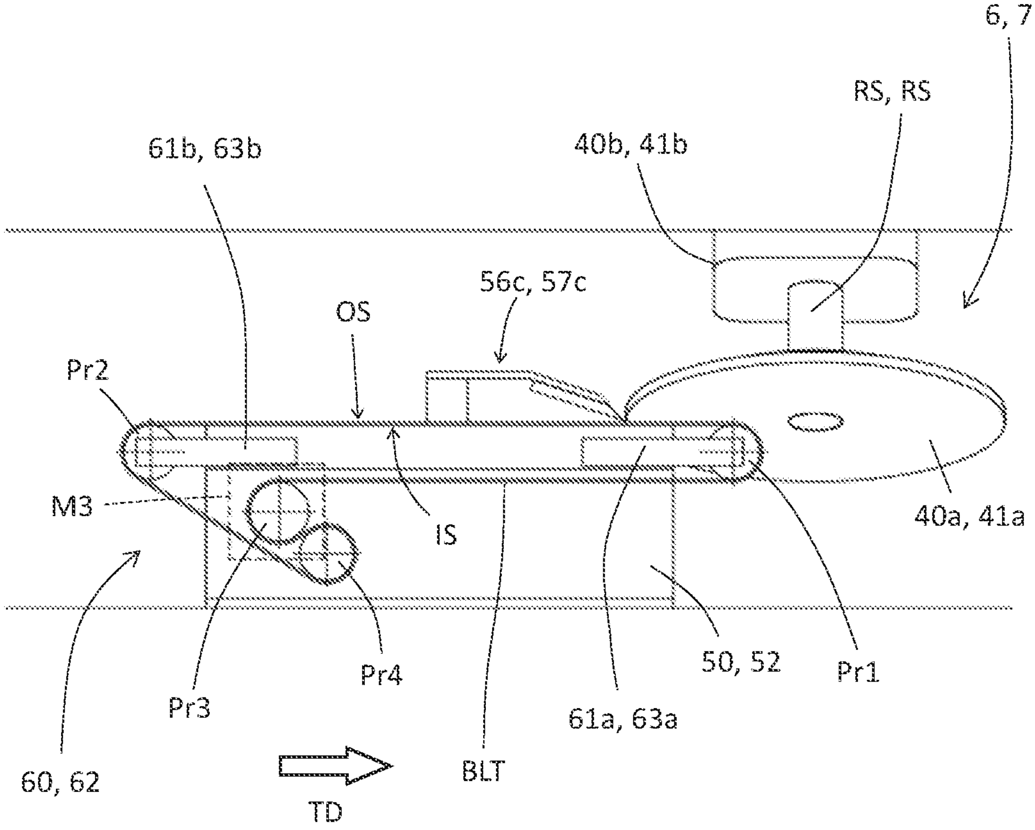
FIG. 13 is a configuration diagram schematically showing a configuration of auxiliary conveyors 60, 62.

As shown in FIG. 13, the pulleys Pr1, Pr1 are supported rotatably by the support arms 61*a*, 63*a* respectively fixed to the bases 50, 52, and the pulleys Pr2, Pr2 are supported rotatably by the support arms 61*b*, 63*b* respectively fixed to the bases 50, 52. As shown in FIGS. 10 and 11, the support arms 61*a*, 63*a*, 61*b*, 63*b* are fixed to the inner surfaces of the bases 50, 52 (the surfaces directed toward the clamping bars 28, 29, among the surfaces of the bases 50, 52). As shown in FIG. 13, the support arms 61*a*, 63*a* protrude out from the bases 50, 52 in the transport direction TD of a veneer 90, while the support arms 61*b*, 63*b* protrude out from the bases 50, 52 in the direction opposite to the transport direction TD of a veneer 90. The support arms 61*a*, 63*a* and the support arms 61*b*, 63*b* are positioned at the same elevated height. As a result, the pulleys Pr1 and the pulleys Pr2 are positioned at the same elevated height. That is, the endless belt BLT between the pulley Pr1 and the pulley Pr2 extends horizontally (see FIG. 13). The pulleys Pr1, Pr1 are an example configuration corresponding to the "first pulley" of the claimed invention.

Here, as shown in FIG. 14, the endless belt BLT between the pulley Pr1 and the pulley Pr2 has an inner surface IS that is separated from and opposite to the mount surfaces 50*a*, 52*a* of the base 50, 52 by a predetermined distance. This configuration allows the inner surface IS to contact the mount surfaces 50*a*, 52*a* when the endless belt BLT between the pulley Pr1 and the pulley Pr2 deflects, which limits the deflection of the endless belt BLT. Note that the inner surface IS is opposite to the outer surface OS that functions, in the endless belt BLT, as a transport surface for transporting a veneer 90. The outer surface OS corresponds to the "first surface" of the claimed invention, and the inner surface IS is an example configuration corresponding to the "second surface" of the claimed invention.

As described above, the upper surfaces 54*a*, 55*a* (the surfaces opposite to the contact sections 58, 59) of the circular saw contacting sections 54, 55 are flash with the mount surfaces 50*a*, 52*a*. Accordingly, even if the endless belt BLT between the pulley Pr1 and the pulley Pr2 deflects and contacts the mount surfaces 50*a*, 52*a*, the outer surfaces OS, OS are positioned above the upper surfaces 54*a*, 55*a*, that is, positioned closer to the contact sections 58, 59. Note that, in the present embodiment, the pressing units 56, 57, and the bases 50, 52, the auxiliary conveyors 60, 62, and the circular saw contacting sections 54, 55 are arranged so that the following relational expressions hold true. Thus, both edges 90*a*, 90*b* of a veneer 90 can be reliably pressed against the outer surfaces OS. OS of the endless belt BLT and the upper surfaces 54*a*, 54*a* of the circular saw contacting sections 54, 55 by the contact sections 58, 59 of the pressing units 56, 57.

(Expression 1)

$$a1 \leq t \tag{1}$$

$$a2 \leq t \tag{2}$$

where a1 is the distance from the projections of the contact sections 58, 59 of the pressing units 56, 57 in a pressable state on a virtual projection plane when the scarfing machine 1 is viewed from one side of the transport direction to the projections of the outer surfaces OS. OS on the virtual projection plane; t is the plate thickness of both edges 90*a*, 90*b* of a veneer 90 (see FIG. 14); and a2 is the distance from the projections of the contact sections 58, 59 of the pressing units 56, 57 in a pressable state on a virtual projection plane when the scarfing machine 1 is viewed from one side of the transport direction to the projections of the upper surfaces 54*a*, 55*a* on the virtual projection plane. The a1 corresponds to the "first distance" of the claimed invention, and the a2 is an example configuration corresponding to the "second distance" of the claimed invention. The upper surface 91 is an example configuration corresponding to the "fourth surface" of the claimed invention. Note that the lower surface 93 opposite to the upper surface 91 (see FIG. 14) is an example configuration corresponding to the "third surface" of the claimed invention. Further, the virtual projection plane is an example configuration corresponding to the "first virtual projection plane" of the claimed invention.

The pulleys Pr3. Pr4 are fixed to the inner surfaces of the bases 50, 52 (the surfaces directed toward the clamping bars 28, 29 among the surfaces of the bases 50 52), similar to the pulleys Pr1, Pr2 (see FIG. 11). With such arrangements of the pulleys Pr1, Pr2, Pr3, Pr4, the auxiliary conveyors 60, 62 are positioned between the circular saw contacting sections 54, 55 and the clamping bar 28, 29 when viewed from one side of the transport direction TD, as shown in FIG. 11, and also adjacent to the circular saw contacting sections 54, 55.

Note that the inner surface IS is wound around the pulleys Pr1, Pr2. Pr4*s*, and the outer surface OS is wound around the pulley Pr3. Here, the coefficient of friction between the outer surface OS and the pulley Pr3 is set to be larger than the coefficient of friction between the inner surface IS and the pulley Pr3. This setting allows the rotational driving force of the pulley Pr3 to be reliably transmitted by the endless belts BLT, BLT. As a result, it is possible to improve the transport performance of both edges 90*a* and 90*b* of a veneer 90 in the transport direction TD.

The control device 70 is configured as a microprocessor centered on a CPU, and includes, in addition to the CPU, a ROM for storing processing programs, a RAM for temporarily storing data, an input/output port, and a communication port. The control device 70 receives, through the input port, a detection signal from a sensor for detecting that a veneer 90 is carried into the scarfing machine 1 from the carry-in conveyor 80, and a detection signal from a sensor for detecting the clamping and release of the veneer 90 by the clamping bars 28 and 29. The control device 70 outputs a driving signal to the motors M1, M2, a driving signal to the motors 40*b*, 41*b*, a driving signal to the air cylinders 24*a*, 24*a*, 24*a*, 24*a*, 26*a*, 26*a*, 26*a*, 26*a*, a driving signal to the air cylinders 56*d*, 57*d*, and a driving signal to the motor M3, for example. The control device 70 is an example configuration corresponding to the "control unit" of the claimed invention.

Next, the operation of the scarfing machine 1 of the above-described configuration will be described. When a veneer 90 is carried from the carry-in conveyor 80 to a position where it can be clamped by the pair of clamping bars 28, 29, the CPU of the control device 70 causes the air cylinders 24*a*, 24*a*, 24*a*. 24*a*, 26*a*, 26*a*, 26*a*. 26*a* to be driven so as to clamp the veneer 90 by the pair of clamping bars 28, 29.

Subsequently, the CPU of the control device 70 causes the motors M1. M2 to be driven so as to transport the clamped veneer 90 to the carry-out conveyor 82 at a speed V1 in the transport direction TD, and also causes the motors M3, M3 to be driven so as to rotate the endless belts BLT, BLT of the auxiliary conveyors 60, 62 at a speed V2. Here, in the present embodiment, the speed V2 is set to be slightly lower than the speed V1.

Further, the CPU of the control device 70 causes the motors 40*b*, 41*b* to be driven so as to rotate the circular saws 40*a*, 41*a*, and also causes the air cylinders 56*d*, 57*d* to be driven such that the pressing units 56, 57 (the contact sections 58, 59) press both edges 90*a*, 90*b* of the veneer 90 with a predetermined pressing force toward the endless belts BLT, BLT and the circular saw contacting sections 54, 55 (the upper surfaces 54*a*, 55*a*).

Once both edges 90*a*, 90*b* of the veneer 90 are transported at the speed V1 in the transport direction TD, reach the upstream edges of the endless belts BLT, BLT, and are mounted onto the outer surfaces OS, OS of the endless belts BLT, BLT, both edges 90*a*, 90*b* of the veneer 90 are then transported at the speed V2 in the transport direction TD by the endless belts BLT, BLT. That is, the veneer 90 is transported by the pair of clamping bars 28, 29 in the vicinity of the middle of the fiber direction FD at the speed V1 in the transport direction TD, and both edges 90*a*, 90*b* of a veneer 90 are transported by the endless belts BLT, BLT at the speed V2 in the transport direction TD.

Figure 15:
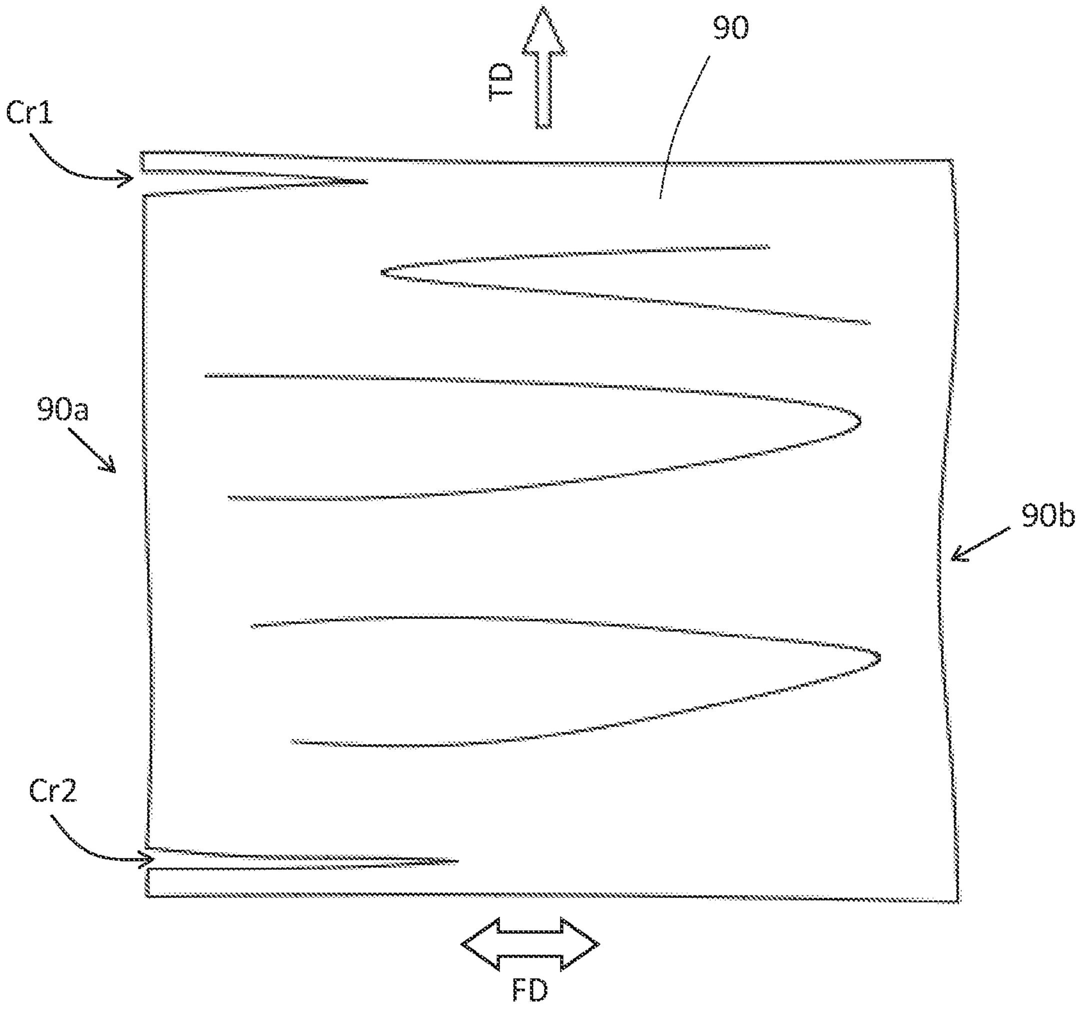
FIG. 15 is a top view of a veneer 90 having cracks Cr1, Cr2.

As shown in FIG. 15, here, a case is assumed where the edge 90*a* of the transported veneer 90 has cracks Cr1, Cr2 along the fiber direction of the veneer 90. Note that, the crack Cr1 is located downstream of the transport direction TD, and the crack Cr2 is located upstream of the transport direction TD, in the veneer 90. The edge 90*a* having the cracks Cr1, Cr2 is transported at the speed V2 in the transport direction TD by the endless belts BLT, BLT, and thereby the edge 90*a* is pressed by the pressing units 56, 57 (the contact sections 58, 59), which reduces the frictional force acting on the edge 90*a* in the direction opposite to the transport direction TD. This makes it possible to reduce the moment occurring in the direction of widening the cracks Cr1, Cr2 that is caused by the friction, or in the direction of excessively closing the cracks Cr1, Cr2.

The speed V2 of the edge 90*a* in the transport direction TD is lower than the speed V1 of the veneer 90 transported by the pair of clamping bars 28, 29 in the transport direction TD, and thereby a moderate moment acts on the veneer 90 in the direction of closing the crack Cr1, wherein the moment being caused by the above-described frictional force acting in the direction opposite to the transport direction TD. As a result, it is possible to effectively reduce any unmachined scarf face portions that occur when scarfing is conducted with the crack Cr1 located downstream of the transport direction TD being widened, and/or any steps in the scarf face that occur when the crack Cr1 returns to its original (open) state due to the elasticity of the veneer 90 after scarfing has been conducted with the crack Cr1 being excessively closed.

Then, when both edges 90*a*. 90*b* of the veneer 90 reach the contact position CpL, the CPU of the control device 70 causes the motors M3. M3 to be driven such that the endless belts BLT, BLT of the auxiliary conveyors 60, 62 rotate at a speed V3. Here, in the present embodiment, the speed V3 is set to be slightly greater than the speed V1.

In this way, after both edges 90*a*, 90*b* of veneer 90 have reached the contact position CpL, that is, after the scarfing on both edges 90*a*, 90*b* has started, the speed V3 of the edge 90*a* running in the transport direction TD excesses the speed V1 of the veneer 90 in the transport direction TD transported by the pair of clamping bars 28, 29, and thereby a moderate moment acts on the edge 90*a* in the direction of closing the crack Cr2, wherein the moment being caused by the frictional force in the same direction as the transport direction TD. As a result, it is possible to effectively reduce any unmachined scarf face portions that occur when scarfing is conducted with the crack Cr2 located upstream of the transport direction TD being widened, and/or any steps in the scarf face that occur when the crack Cr2 returns to its original (open) state due to the elasticity of the veneer 90 after scarfing has been conducted with the crack Cr2 being excessively closed. Here, the "after both edges 90*a*, 90*b* of veneer 90 have reached" and the "after the scarfing on both edges 90*a*, 90*b* has started" encompass the concept of "immediately after the reach" and "immediately after the start", and also the "after a predetermined period of time after the reach" and the "after a predetermined period of time after the start."

In addition, if the dimension of a veneer 90 to be scarfed in the direction along the fiber direction FD (the dimension of a veneer 90 in the direction orthogonal to both the transport direction TD and the thickness direction of the veneer 90) is changed to a larger one, the amount of protrusion of both edges 90*a* and 90*b* from the clamping bars 28 and 29 increases. Accordingly, in order to regulate the protrusion amount of both edges 90*a*, 90*b* to a predetermined amount for scarfing, it is necessary to relocate (move) the supporting tables 8, 9 away from the clamping bars 28, 29. In this case, the distance from the supporting tables 8, 9 to the clamping bars 28, 29 increases, and the moment increases, the moment being proportional to the distance and the above-described frictional force and also acting in the direction of widening the above-described cracks Cr1, Cr2 or in the direction of excessively closing the cracks Cr1 and Cr2. In order to reduce the moment, conventionally, it is also necessary to change the arrangement of the clamping bars 28, 29 (to change the structure of the clamping-transporting unit 4) along with the change in the arrangement of the supporting tables 8, 9 so that the distance from the supporting tables 8, 9 to the clamping bars 28, 29 is decreased. However, in the present embodiment, since the above-described frictional force can be reduced, it is possible to cope with this problem by simply changing the arrangement of the supporting tables 8, 9. As a result, it is possible to deal with any dimensional differences in veneers 90 while limiting the extent of changes to the scarfing machine 1.

According to the present embodiment, scarfing is conducted onto both edges 90*a*, 90*b* while deflection such as twist and curve of both edges 90*a*, 90*b* that occurs in both edges 90*a*, 90*b* is corrected by the pressing units 56, 57 (the contact sections 58, 59), which thereby secures scarf faces to be well-machined. In addition, both edges 90*a*, 90*b* are reliably pressed against the outer surfaces OS. OS of the endless belts BLT, BLT by the pressing units 56, 57 (the contact sections 58, 59), thereby enabling both edges 90*a*, 90*b* to be reliably transported in the transport direction TD. Thus, any occurrence of scarf face defects, generation of unmachined scarf face portions, and generation of steps in the scarf face can be reliably reduced.

Needless to say, since the scarfing is conducted on both edges 90*a* and 90*b* while the veneer 90 is transported, the productivity is improved as compared to a configuration in which scarfing is conducted on both edges 90*a* and 90*b* while the transport of a veneer 90 is temporarily stopped.

In the present embodiment, the surfaces of the contact sections 58, 59 of the pressing units 56, 57 that are located opposite to the circular saw contacting sections 54, 55 and the endless belts BLT, BLT decline gradually approaching the circular saw contacting sections 54, 55 and the endless belts BLT, BLT toward the tips (toward the left side of FIG. 9). However, the configuration is not limited to this one. For example, the surfaces of the contact sections 58, 59 located opposite to the circular saw contacting sections 54, 55 and the endless belts BLT, BLT may be parallel to the mount surfaces 50*a*, 52*a* of the bases 50, 52 (the upper surfaces 54*a*, 55*a* of the circular saw contacting sections 54, 55). Alternatively, the circular saw contacting sections 54, 55 may be configured to be spherical. In this case, the contact sections 58, 59 and both edges 90*a*, 90*b* contact each other in surface or at point.

In the present embodiment and the above modification, the mount surfaces 50*a*, 52*a* are separated from the inner surfaces IS, IS of the endless belts BLT. BLT by a predetermined distance. However, a configuration is possible in which there is no predetermined distance therebetween, that is, the inner surfaces IS, IS are in contact with the mount surfaces 50*a*, 52*a*.

Figure 16:
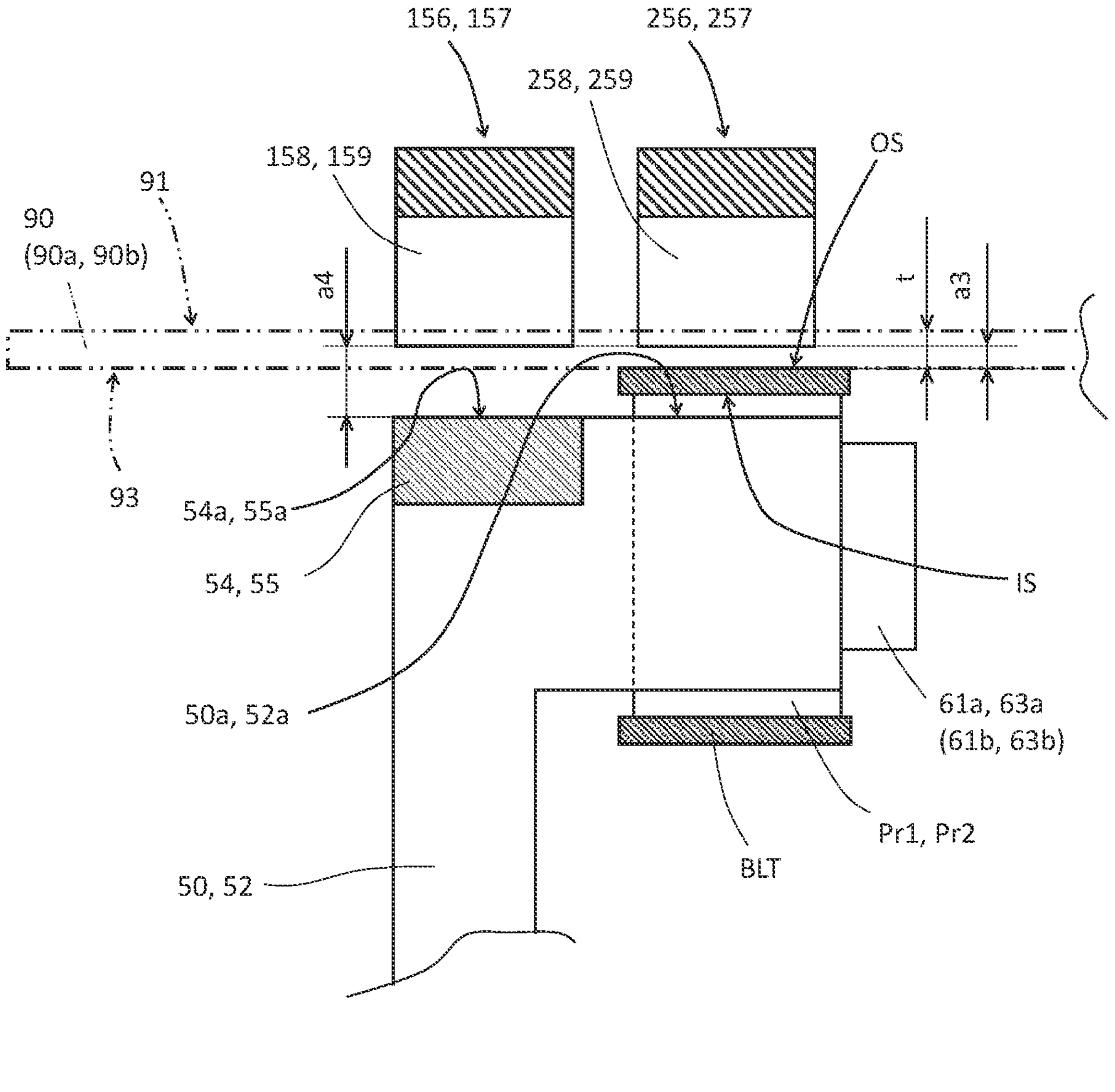
FIG. 16 is an explanatory diagram showing the positional relationship between contact sections 158, 159, 258, 259, the upper surfaces 54*a*, 55*a* of circular saw contacting sections 54, 55, the outer surfaces OS, OS and the inner surfaces IS, IS of the endless belts BLT, BLT, the mount surfaces 50*a*, 52*a*, and the upper surface 91 and the lower surface 93 of a veneer 90.

In the present embodiment, the single pair of pressing units 56, 57 press both edges 90*a*, 90*b* of a veneer 90 toward the endless belts BLT. BLT and the circular saw contacting sections 54, 55. However, as shown in FIG. 16 which illustrates modified pressing unit 156, 157, 256, 257, a configuration is possible in which pressing units 156, 157 are used to press both edges 90*a*, 90*b* toward the circular saw contacting sections 54, 55, and also pressing units 256, 257 are used to press both edges 90*a*, 90*b* of a veneer 90 toward the endless belts BLT, BLT. In this case, the pressing units 156, 157 and the pressing units 256, 257 may be configured to be swung (rotated) by air cylinders individually (not shown). Further, the pressing units 156, 157, 256, 257, the bases 50, 52, the auxiliary conveyors 60, 62, and the circular saw contacting sections 54, 55 may be arranged so that the following relational expressions hold true.

(Expression 2)

$$a3 \leq t \tag{3}$$

$$a4 \leq t \tag{4}$$

where a3 is the distance from the projections of the contact sections 258, 259 of the pressing units 256, 257 in a pressable state on a virtual projection plane when the scarfing machine 1 is viewed from one side of the transport direction to the projections of the outer surfaces OS, OS on the virtual projection plane (see FIG. 16); and a4 is the distance from the projections of the contact sections 158, 159 of the pressing units 156, 157 in a pressable state on a virtual projection plane when the scarfing machine 1 is viewed from one side of the transport direction to the projections of the upper surfaces 54*a*, 55*a* on the virtual projection plane (see FIG. 16). The a3 corresponds to the "first distance" of the claimed invention, and the a4 corresponds to the "second distance" of the claimed invention. The virtual projection plane is an example configuration corresponding to "first virtual projection plane" of the claimed invention.

Here, the contact sections 258, 259 correspond to the "first contact section" of the claimed invention, the contact sections 158, 159 correspond to the "second contact section" of the claimed invention, the upper surfaces 54*a*, 55*a* correspond to the "third contact section" of the claimed invention, the upper surface 91 corresponds to the "fourth contact section" of the claimed invention, the outer surfaces OS, OS correspond to the "first surface" of the claimed invention, the inner surfaces IS, IS are an example configuration corresponding to "second surface" of the claimed invention. The lower surface 93 opposite to the upper surface 91 (see FIG. 16) is an example configuration corresponding to the "third surface" of the claimed invention.

According to the configuration, it is possible to reliably press both edges 90*a*, 90*b* against the upper surfaces 54*a*. 55*a* of the circular saw contacting sections 54, 55 by the pressing units 156, 157 (the contact sections 158, 159), and thereby scarfing is conducted on both edges 90*a*, 90*b* in a stable state. In addition, both edges 90*a*, 90*b* can be reliably pressed against the outer surfaces OS, OS of the endless belts BLT, BLT by the pressing units 256, 257 (the contact sections 258, 259). This allows both edges 90*a*, 90*b* to be reliably transported in the transport direction TD. As a result, any occurrence of scarf face defects, generation of unmachined scarf face portions, and generation of steps in the scarf face can be more reliably reduced.

In the present embodiment and the above modification, the auxiliary conveyors 60, 62 are used to transport both edges 90*a*, 90*b* of a veneer 9) in the transport direction TD. However, the configuration is not limited to this one. For example, as shown in modified scarfing machines 300, 400, 500 in FIGS. 17 to 19, instead of the auxiliary conveyors 60, 62, disc transport mechanisms 360, 362, 460, 462, 560, 562 may be used to transport both edges 90*a*, 90*b* of a veneer 90 in the transport direction TD. The modified scarfing machines 300, 400, 500 are configured to include disc transport mechanisms 360, 362, 460, 462, 560, 562, instead of the auxiliary conveyors 60, 62, in the scarfing machine 1 of the present embodiment. Thus, in order to avoid redundant explanations, the same reference numerals are given to the configurations of the modified scarfing machines 300, 400, and 500 that correspond to the configurations of the scarfing machine 1 of the present embodiment, and detailed explanations thereof will be omitted.

Figure 17:
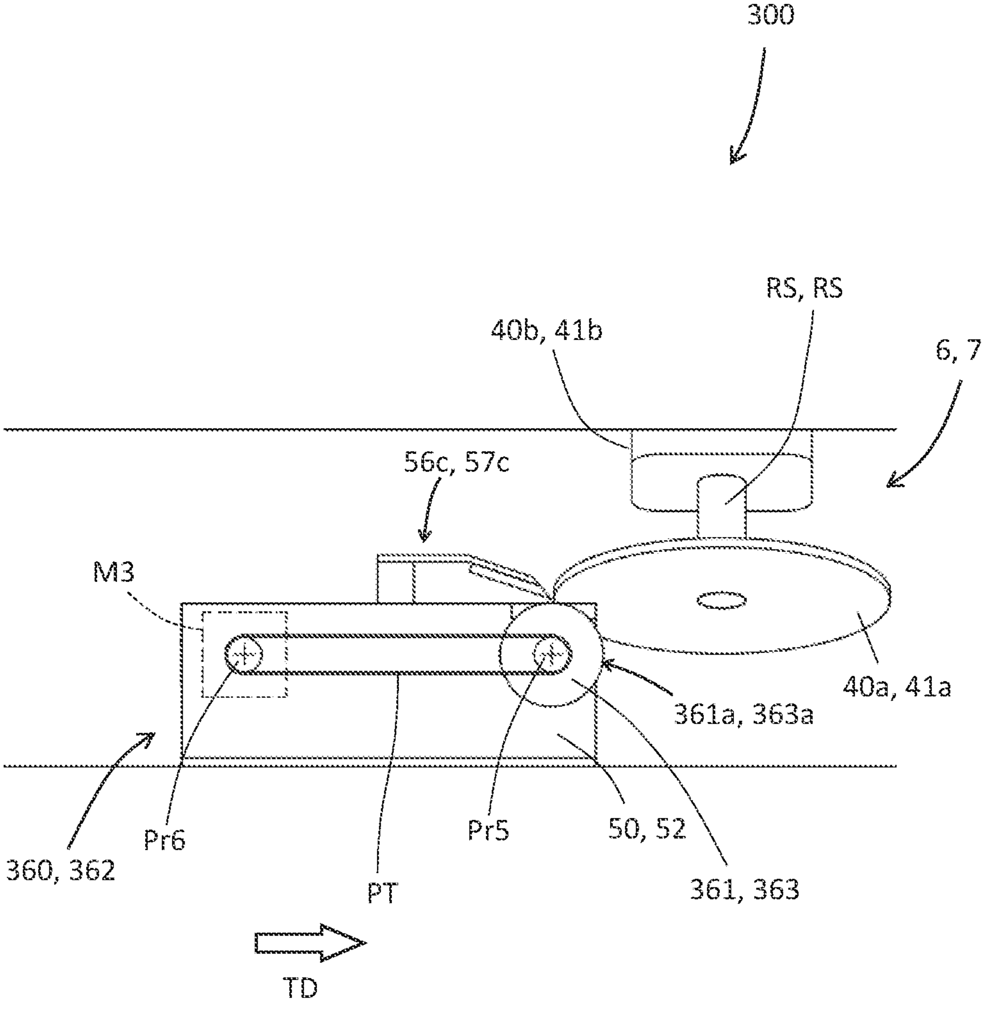
FIG. 17 is a configuration diagram schematically showing a configuration of disc transport mechanisms 360, 362 in a modified scarfing machine 300.
Figure 18:
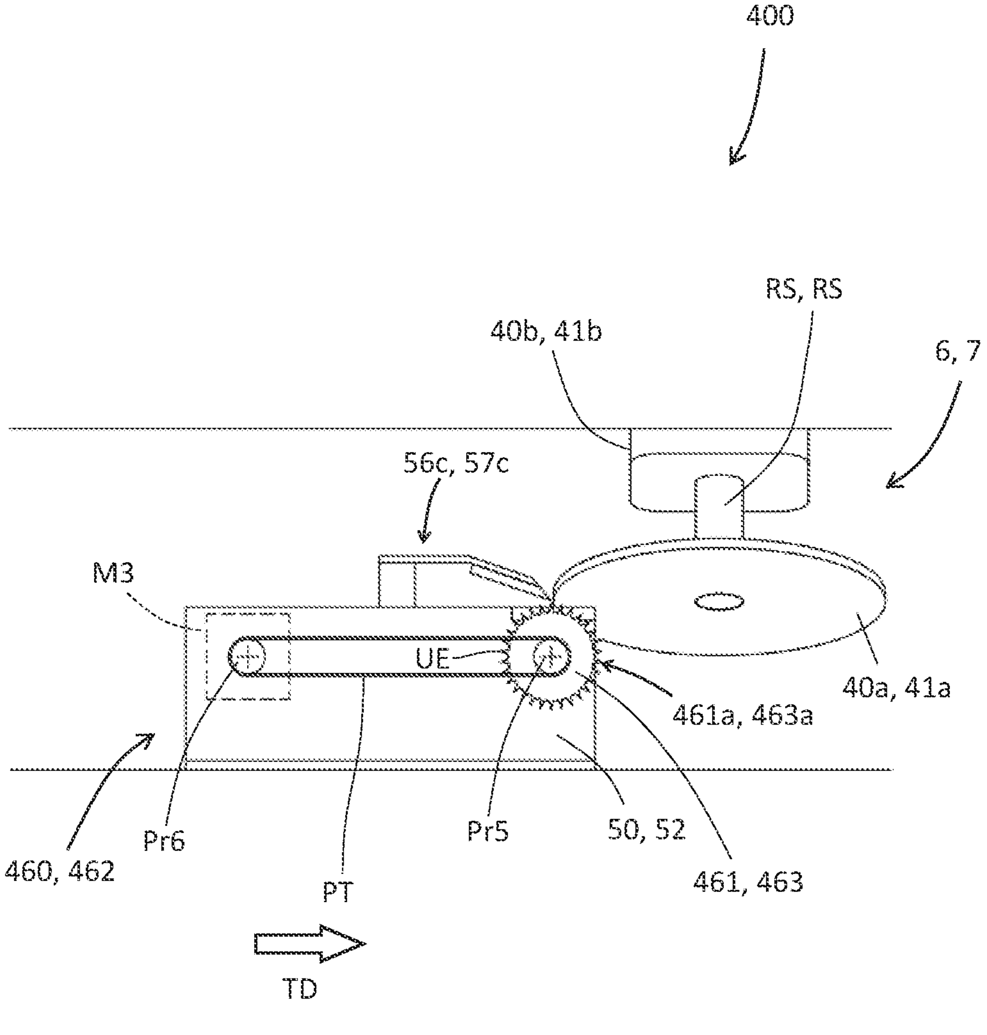
FIG. 18 is a configuration diagram schematically showing a configuration of disc transport mechanisms 460, 462 in a modified scarfing machine 400.
Figure 19:
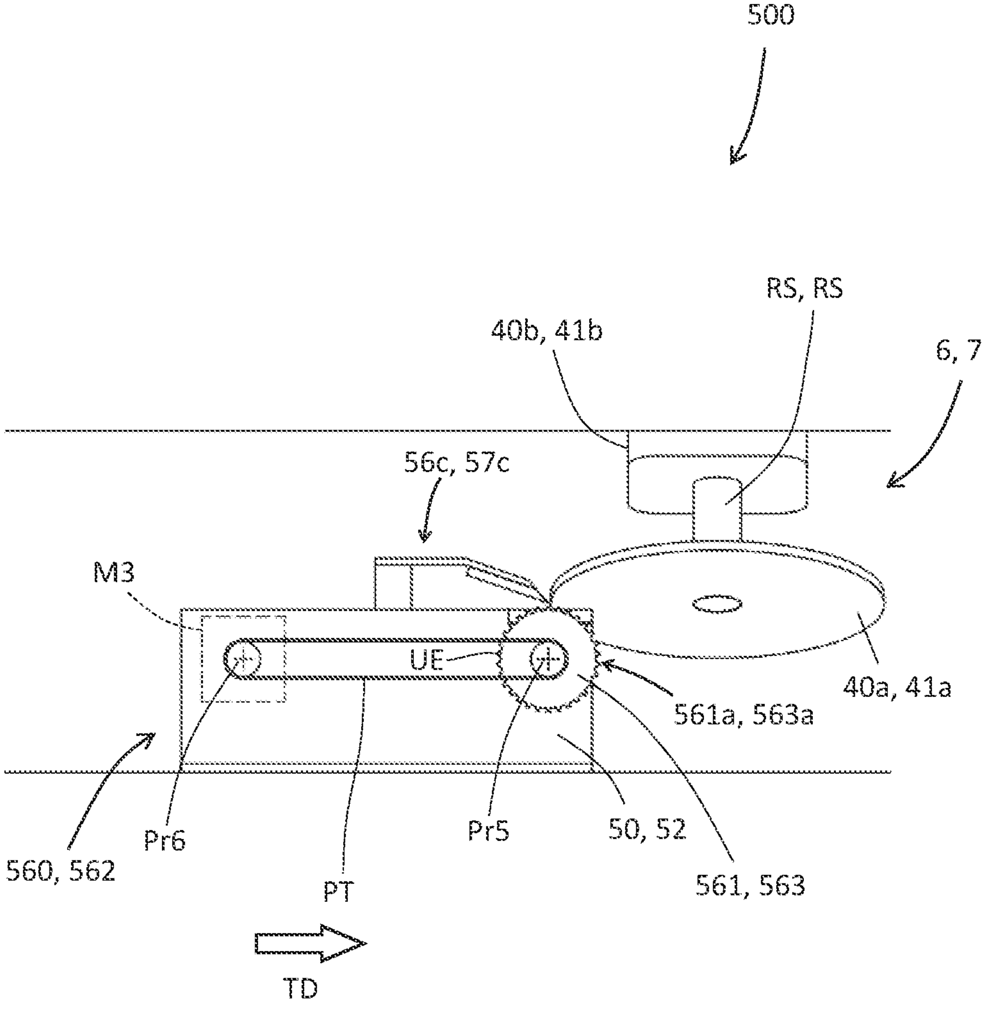
FIG. 19 is a configuration diagram schematically showing a configuration of disc transport mechanisms 560, 562 in a modified scarfing machine 500.

As shown in FIGS. 17 to 19, the disc transport mechanisms 360, 362, 460, 462, 560, 562 are identical to each other in configuration, except discs 361, 363, 461, 463, 561, 563 therein are different in shape. That is, the disc transport mechanisms 360, 362, 460, 462, 560, 562 include two pulleys Pr5, Pr6, the discs 361, 363, 461, 463, 561, 563, a power transmitting member PT such as a belt and a chain that is wound around the two pulleys Pr5, Pr6, and a motor M3 having a rotational shaft (not shown) that is connected to the pulley Pr6. The disc transport mechanisms 360, 362,

460, 462, 560, 562 correspond to the "first-edge transport unit" of the claimed invention, the disc 361, 363, 461, 463, 561, 563 correspond to the "disc body" of the claimed invention, and the pulleys Pr5, Pr6, the power transmitting member PT, and the motor M3 are example configurations corresponding to the "driving section" of the claimed invention.

Figure 20:
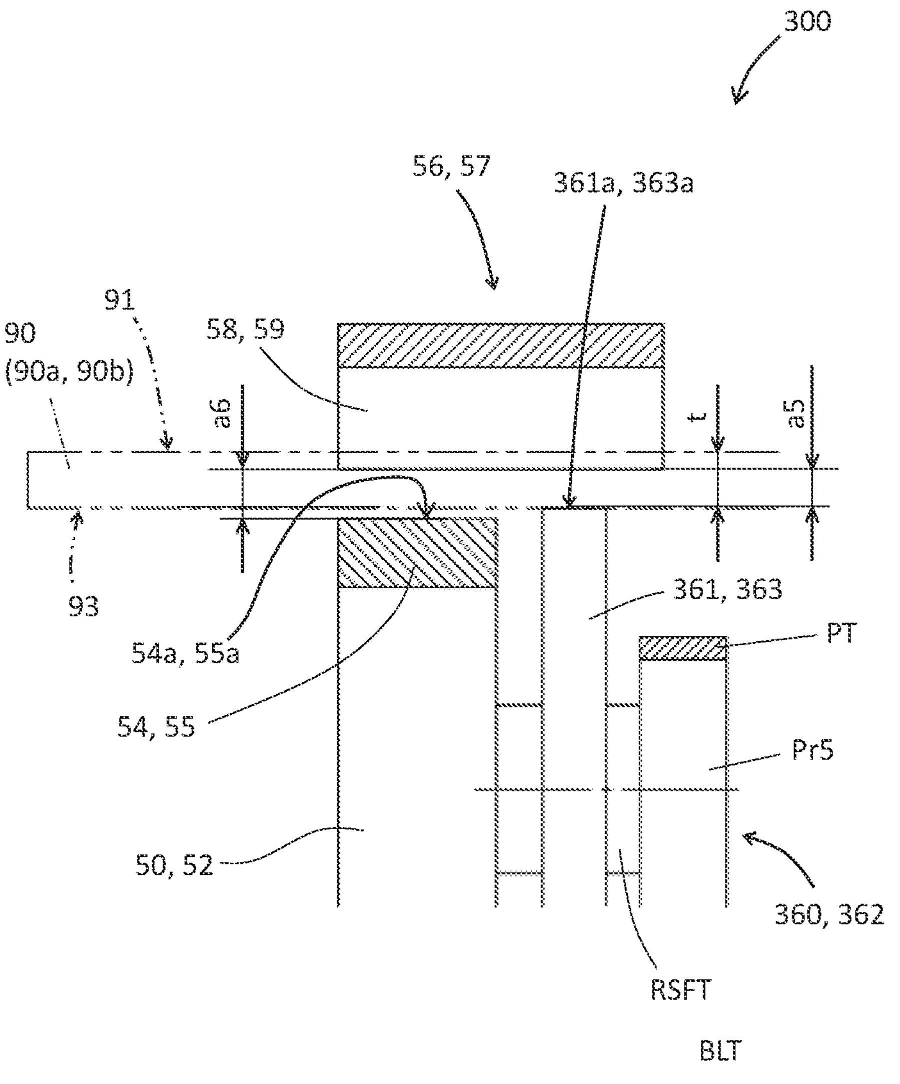
FIG. 20 is an explanatory diagram showing the positional relationship between contact sections 58, 59, the upper surfaces 54*a*, 55*a* of the circular saw contacting sections 54, 55, the outer peripheral surfaces 361*a*, 363*a* of disc 361, 363, and the upper surface 91 and the lower surface 93 of a veneer 90.
Figure 21:
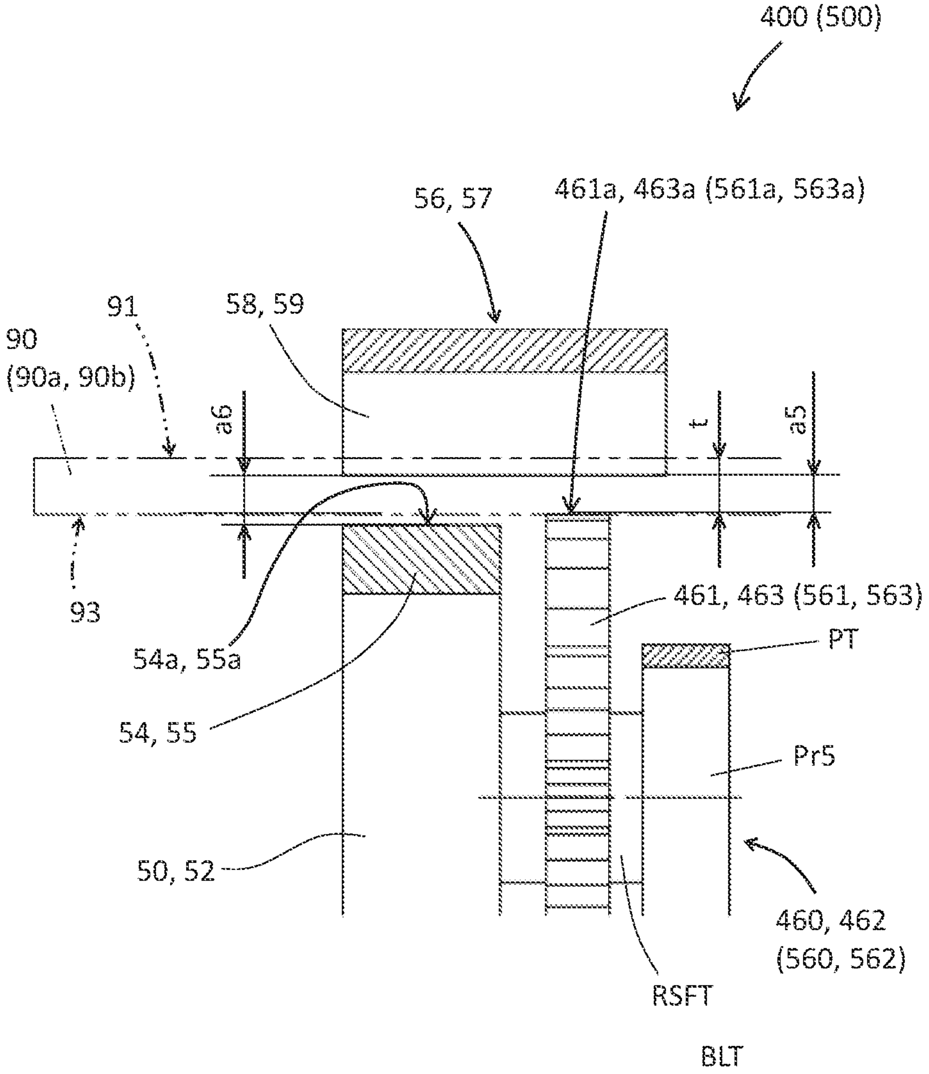
FIG. 21 is an explanatory diagram showing the positional relationship between contact sections 58, 59, the upper surfaces 54*a*. 55*a* of the circular saw contacting sections 54, 55, the outer peripheral surfaces 461*a*. 463*a*, 561*a*, 563*a* of disc 461, 463, 561, 563, and the upper surface 91 and the lower surface 93 of a veneer 90.

As shown in FIGS. 17 to 19, the pulleys Pr5, Pr6 are rotatably supported respectively by the bases 50, 52 via rotational shafts RSFT (see FIGS. 20 and 21). The disc 361, 363, 461, 463, 561, 563 are integrally supported by the rotational shafts RSFT that support the pulley Pr5 rotatably, as shown in FIGS. 20 and 21. The disc 361, 363, 461, 463, 561, 563 are arranged between the bases 50, 52 and the pulley Pr1. The outer peripheral surfaces 361*a*, 363*a* of the discs 361, 363 have no concave and convex parts as shown in FIG. 17, but the outer peripheral surfaces 461*a*, 463*a*, 561*a*, 563*a* of the discs 461, 463, 561, 563 have a plurality of concave and convex parts UE, as shown in FIGS. 18 and 19. The convex parts UE of the outer peripheral surfaces 461*a*, 463*a* are sharp at the tips, and convex parts UE of the outer peripheral surfaces 561*a*, 563*a* are flat at the tips. The outer peripheral surfaces 361*a*, 363*a*, 461*a*, 463*a*, 561*a*, 563*a* are an example configuration corresponding to the "mount section" of the claimed invention.

The pressing units 56, 57, the bases 50, 52, the disc transport mechanisms 360, 362, 460, 462, 560, 562, and the circular saw contacting sections 54, 55 are arranged so that the following relative expressions hold true.

(Expression 3)

$$a5 \le t \quad (5)$$

$$a6 \le t \quad (6)$$

where a5 is the distance from the projections of the contact sections 58, 59 of the pressing units 56, 57 in a pressable state on a virtual projection plane when the scarfing machine 1 is viewed from one side of the transport direction to the projections of the outer peripheral surfaces 361*a*, 363*a*, 461*a*, 463*a*, 561*a*, 563*a* on the virtual projection plane; t is the plate thickness of both edges 90*a*. 90*b* of a veneer 90 (see FIGS. 20 and 21); and a6 is the distance from the projections of the contact sections 58, 59 of the pressing units 56, 57 in a pressable state on a virtual projection plane when the scarfing machine 1 is viewed from one side of the transport direction to the projections of the upper surfaces 54*a*, 55*a* on the virtual projection plane. The a5 corresponds to the "third distance" of the claimed invention, and the a6 is an example configuration corresponding to the "fourth distance" of the claimed invention. The upper surface 91 is an example configuration corresponding to "sixth surface" of the claimed invention. Note that the lower surface 93 opposite to the upper surface 91 (see FIGS. 20 and 21) is an example configuration corresponding to "fifth surface" of the claimed invention. Further, the virtual projection plane is an example configuration corresponding to "first virtual projection plane" of the claimed invention. Furthermore, the portions of the contact sections 58, 59 located opposite to the outer peripheral surfaces 361*a*, 363*a*, 461*a*, 463*a*, 561*a*, 563*a* and the upper surfaces 54*a*, 55*a* correspond respectively to the "fourth contact section" and the "fifth contact section" of the claimed invention. The upper surfaces 54*a*, 55*a* are an example configuration corresponding to "sixth contact section" of the claimed invention.

In the present embodiment, the speed (V2) at which the endless belts BLT, BLT transport both edges 90*a*. 90*b* of a veneer X) until both edges 90*a*, 90*b* reach the contact position CpL is set to be lower than the speed (V1) at which the pair of clamping bars 28, 29 transport the veneer 90. After both edges 90*a*, 90*b* have reached the contact position CpL, that is, after scarfing on both edges 90*a*, 90*b* has started, the speed (V3) at which the endless belts BLT, BLT transport both edges 90*a*, 90*b* is set to be lower than the speed (V1) at which the pair of clamping bars 28, 29 transport the veneer 90. However, the configuration is not limited to this one. For example, a configuration is possible in which, until both edges 90*a*, 90*b* of a veneer 90 reach the contact position CpL, the speed (V2) at which the endless belts BLT. BLT transport both edges 90*a*, 90*b* is smaller than the speed (V1) at which the pair of clamping bars 28, 29 transport the veneer 90, and after both edges 90*a*, 90*b* have reached the contact position CpL, that is, after scarfing has started on both edges 90*a*, 90*b*, the speed (V1) at which the pair of clamping bars 28, 29 transport the veneer 90 is equal to the speed (V1) at which the endless belts BLT, BLT transport both edges 90*a*, 90*b*. Alternatively, a configuration is possible in which, until both edges 90*a*, 90*b* of a veneer 90 reach the contact position CpL, the speed (V1) at which the pair of clamping bars 28, 29 transport the veneer 90 is equal to the speed (V1) at which the endless belts BLT, BLT transport both edges 90*a*, 90*b*, and after both edges 90*a*, 90*b* has reached the contact position CpL, that is, after scarfing has started on both edges 90*a*, 90*b*, the speed (V3) at which the endless belts BLT, BLT transport both edges 90*a*, 90*b* is greater than the speed (V1) at which the pair of clamping bars 28, 29 transport the veneer 90. Further, the speed (V1) at which the endless belts BLT, BLT transport both edges 90*a*, 90*b* may be set to be constantly equal to the speed (V1) at which the pair of clamping bars 28, 29 transport the veneer 90.

The above-described configurations also limit the frictional force that is caused by pressing of both edges 90*a*. 90*b* by the pressing units 56, 57 and that acts on both edges 90*a*, 90*b* in the direction opposite to the transport direction TD. Accordingly, when both edges 90*a*, 90*b* has cracks or crevices, the moment can be reduced that occurs in the direction of widening the cracks or crevices caused by the above-described frictional force, or in the direction of excessively closing the cracks or crevices. Hence, it is possible to well decrease any defects in the resulting scarf face, generation of unmachined scarf face portions that is caused by machining of the widened cracks or crevices, or steps in the resulting scarf face that are caused by the returning (opening) of the cracks or crevices due to the elasticity of the veneer after scarfing has been conducted with the cracks or crevices being closed. As a result, even if the first edge has cracks or crevices, scarfing can be conducted satisfactorily.

Figure 22:
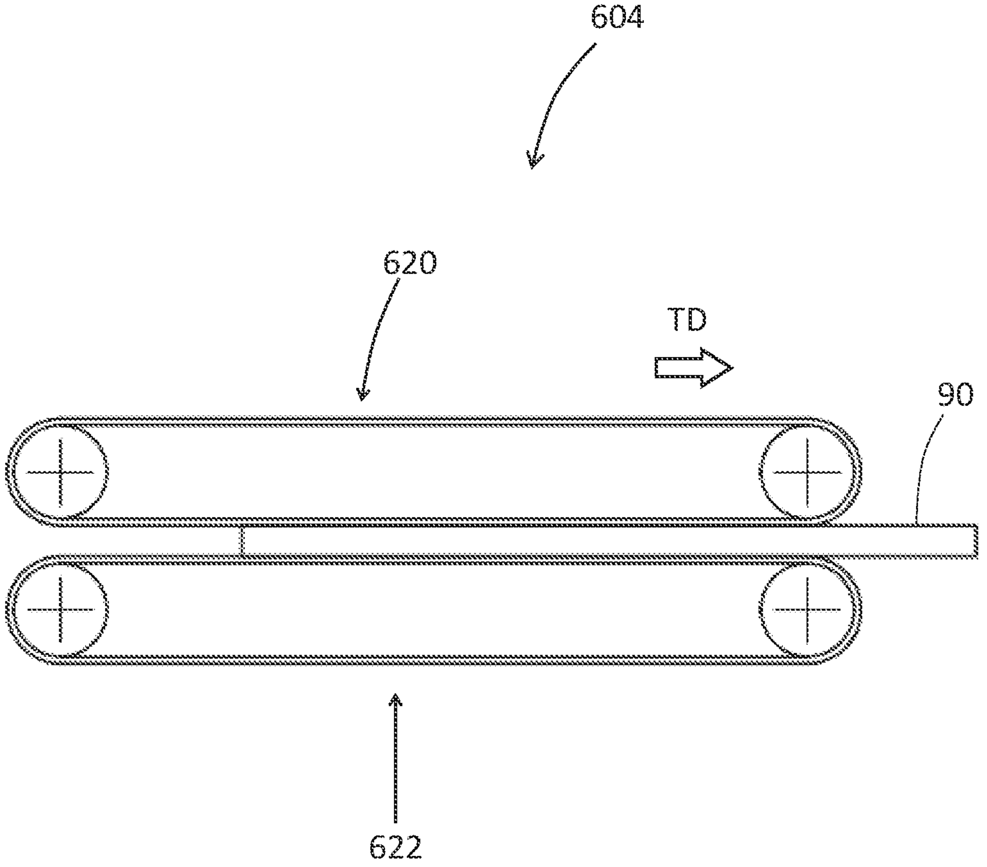
FIG. 22 is an external view showing an external appearance of a modified clamping-transporting unit 604.
Figure 23:
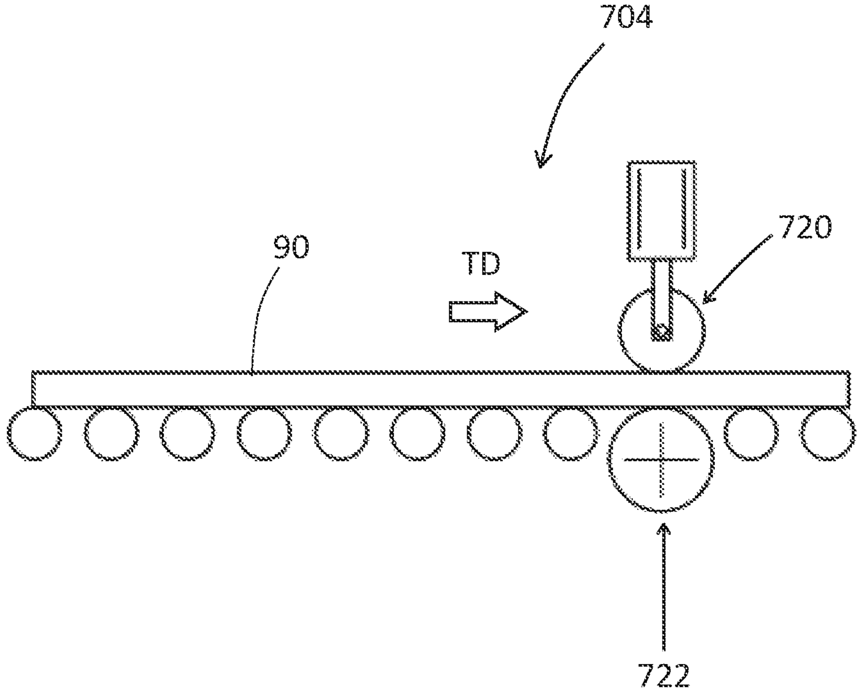
FIG. 23 is an external view showing an external appearance of a modified clamping-transporting unit 704.

In the present embodiment and the above modification, the clamping-transporting unit 4 includes the upper-side clamper 20 and the lower-side clamper 22, and the upper-side clamper 20 and the lower-side clamper 22 clamp a veneer 90 therebetween so that the veneer 90 is transported in the transport direction TD. However, the configuration is not limited to this one. For example, as shown in a modified clamping-transporting unit 604 illustrated in FIG. 22, a configuration is possible in which the clamping-transporting unit 604 includes an upper conveyor 620 and a lower conveyor 622, and transports a veneer 90 in the transport direction TD, with the veneer 90 being clamped by the upper conveyor 620 and the lower conveyor 622. Alternatively, as shown in a modified clamping-transporting unit 704 illustrated in FIG. 23, the clamping-transporting unit 704 may include an upper-side clamping roll 720 and a lower-side clamping roll 722, and the veneer 90 is transported in the transport direction TD with the veneer 90 being clamped by the upper-side clamping roll 720 and the lower-side clamping roll 722. The lamping-transporting units 604, 704 are each an example configuration corresponding to the "holding-transporting unit" of the claimed invention.

In the present embodiment and the above modification, a veneer 90 is transported in the transport direction TD while being clamped. However, the configuration is not limited to this one. As long as a veneer 90 is transported in the transport direction TD in a state where the veneer 90 is held, a configuration is possible in which, instead of the clamping-transporting unit 4, a suction-transporting unit is used for transporting a veneer 90 in the transport direction TD with the veneer 90 being sucked, or a sticking-transporting unit is used for transporting a veneer 90 in the transport direction TD with the veneer 90 being stuck and held, for example.

Figure 24:
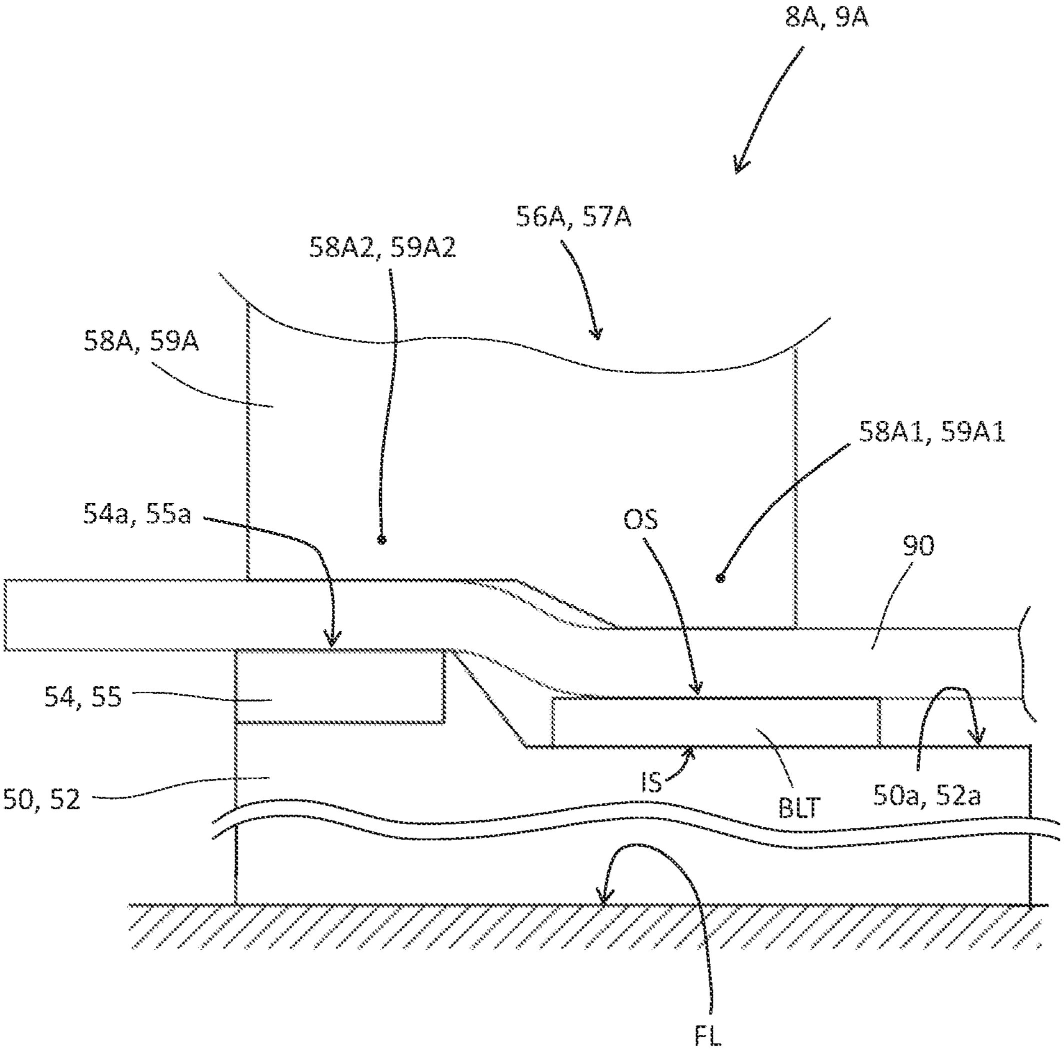
FIG. 24 is a configuration diagram schematically showing a configuration of modified supporting tables 8A, 9A.
Figure 25:
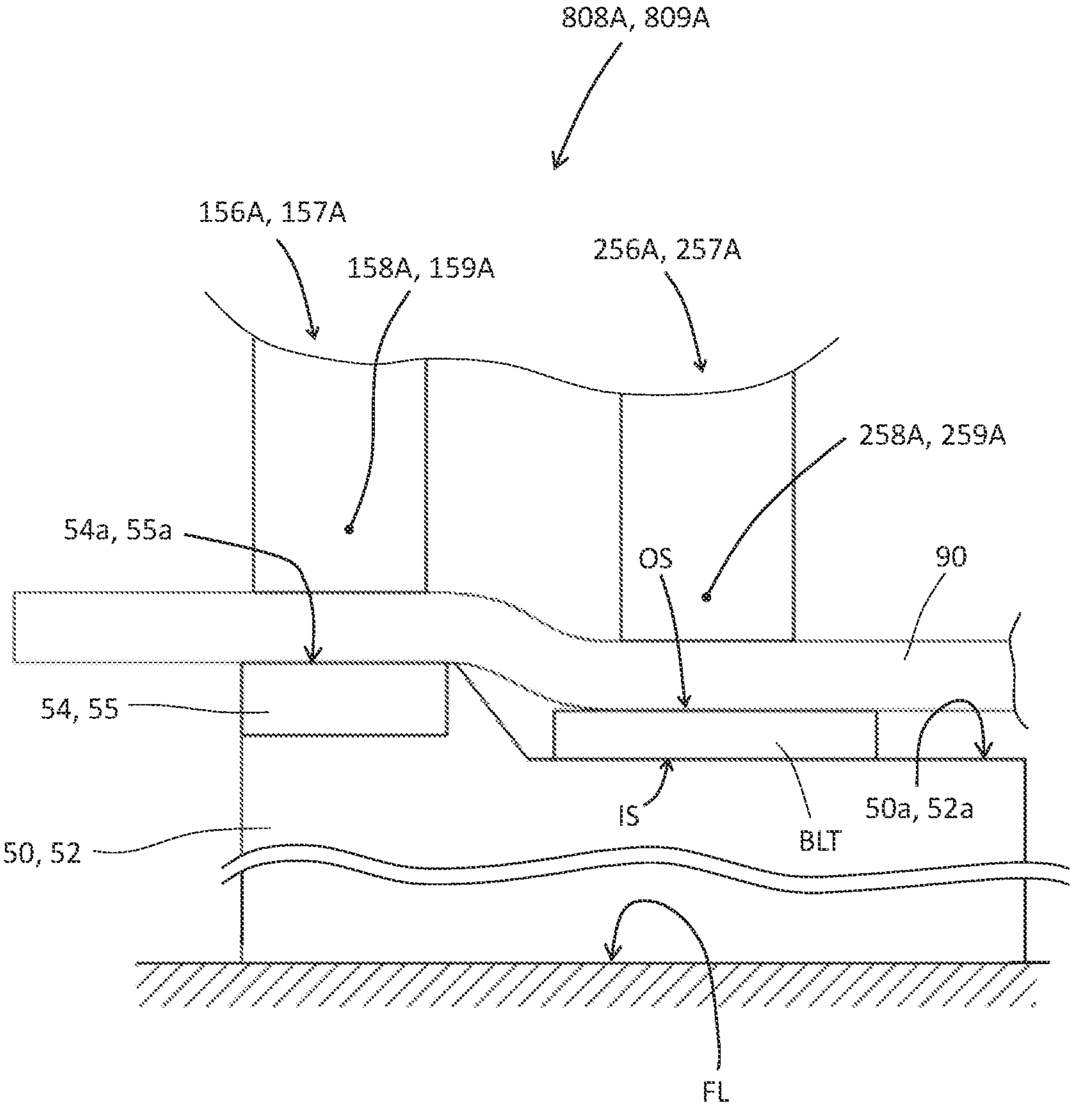
FIG. 25 is a configuration diagram schematically showing a configuration of modified supporting tables 808A, 899A.

In the present embodiment and the above modification, even if the endless belt BLT between the pulley Pr1 and the pulley Pr2 deflects and contacts the mount surfaces 50*a*, 52*a*, the outer surfaces OS. OS are positioned above the upper surfaces 54*a*, 55*a*, that is, positioned closer to the contact sections 58, 59. However, the configuration is not limited to this one, as long as both edges 90*a*. 90*b* of a veneer 90 are reliably pressed against the outer surfaces OS, OS of the endless belt BLT and the upper surfaces 54*a*, 55*a* of the circular saw contacting sections 54, 55 by the contact sections 58, 59, 158, 159, 258, 259 of the pressing units 56, 57, 156, 157, 256, 257. For example, as shown in the modified supporting tables 8A, 9A, 808A, 809A in FIGS. 24 and 25, a configuration is possible in which the outer surfaces OS, OS are positioned below the upper surfaces 54*a*, 55*a*, that is, closer to a floor surface FL when the endless belt BLT deflects and the inner surface IS contacts the mount surfaces 50*a*, 52*a*, in a case where the portions 58A1, 59A1 opposite to the outer surfaces OS, OS in the contact section 58A, 59A of the pressing unit 56A, 57A and the contact section 258A, 259A of the pressing unit 256A, 257A are respectively disposed below the portions opposite to the upper surfaces 54*a*, 55*a* in the contact section 58A, 59A of the pressing unit 56A, 57A and the contact section 158A, 159A of the pressing units 156A, 157A, that is, closer to the floor surface FL. The portions 58A1, 59A1 in the contact section 58A, 59A that are opposite to the outer surfaces OS. OS correspond to the "first contact section" and the "fourth contact section" of the claimed invention, and the portions 58A2, 59A2 in the contact section 58A, 59A that are opposite to the upper surfaces 54*a*, 55*a* are example configurations corresponding to the "second contact section" and the "fifth contact section" of the claimed invention. The pressing units 156A, 157A correspond to the "second pressing section" of the claimed invention, and the pressing unit 256A, 257A are example configurations corresponding to the "first pressing section" of the claimed invention. Further, the contact sections 158A, 159A correspond to the second contact section" of the claimed invention, and the contact sections 258A, 259A are example configurations corresponding to the "first contact section" of the claimed invention.

In the present embodiment and the above modification, the scarfing machine 1 includes the circular saw contacting sections 54, 55. However, the circular saw contacting sections 54, 55 may be omitted.

The present embodiment shows an example of an embodiment for carrying out the claimed invention. Therefore, the claimed invention is not limited to the configurations of the present embodiment. The correspondence between each component of the present embodiment and each component of the claimed invention is shown below.

REFERENCE SIGNS LIST

| REFERENCE SIGNS LIST | |
|---|---|
| 1 | Scarfing machine (Scarfing machine) |
| 2 | Frame (Frame) |
| 4 | Clamping-transporting unit (Holding-transporting unit) |
| 6 | Machining unit (Machining unit) |
| 7 | Machining unit (Machining unit) |
| 8 | Supporting table |
| 9 | Supporting table |
| 12a | Upper beam |
| 12b | Upper beam |
| 12c | Lower beam |
| 12d | Lower beam |
| 14a | Base body |
| 14b | Base body |
| 15a | Leg |
| 15b | Leg |
| 16a | Upper beam |
| 16b | Upper beam |
| 17a | Lower beam |
| 17b | Lower beam |
| 20 | Upper-side clamper |
| 20a | Body |
| 22 | Lower-side clamper |
| 22a | Body |
| 24a | Air cylinder |
| 25 | Rod |
| 26a | Air cylinder |
| 27 | Rod |
| 28 | Clamping bar (Holding unit) |
| 29 | Clamping bar (Holding unit) |
| 30a | Longitudinal piece |
| 30b | Lateral piece |
| 31 | Guide portion |

-continued

| REFERENCE SIGNS LIST | |
|---|---|
| 32a | Longitudinal piece |
| 32b | Lateral piece |
| 33 | Guide portion |
| 34 | Female screw |
| 35 | Female screw |
| 36 | Male threaded rod |
| 37 | Male threaded rod |
| 40a | Circular saw (Cutter) |
| 40b | Motor |
| 41a | Circular saw (Cutter) |
| 41b | Motor |
| 50 | Base (Supporting unit) |
| 50a | Mount surface |
| 52 | Base (Supporting unit) |
| 52a | Mount surface |
| 54 | Circular saw contacting part (Supporting section) |
| 54a | Upper surface (Third contact section, Sixth contact section) |
| 55 | Circular saw contacting part (Supporting section) |
| 55a | Upper surface (Third contact section, Sixth contact section) |
| 56 | Pressing unit (Pressing unit) |
| 56a | Lever section |
| 56a1 | First piece |
| 56a2 | Second piece |
| 56b | Contact section |
| 56c | Pressing arm |
| 56d | Air cylinder |
| 57 | Pressing unit (Pressing unit) |
| 57a | Lever section |
| 57a1 | First piece |
| 57a2 | Second piece |
| 57b | Contact section |
| 57c | Pressing arm |
| 57d | Air cylinder |
| 58 | Contact section (First contact section, Second contact section, Fourth contact section, Fifth contact section) |
| 59 | Contact section (First contact section, Second contact section, Fourth contact section, Fifth contact section) |
| 60 | Auxiliary conveyor (First-edge transporting unit, Conveyor) |
| 61a | Support arm |
| 61b | Support arm |
| 62 | Auxiliary conveyor (First-edge transporting unit, Conveyor) |
| 63a | Support arm |
| 63b | Support arm |
| 70 | Control device (Control unit) |
| 80 | Carry-in conveyor |
| 82 | Carry-out conveyor |
| 90 | Veneer (Vencer) |
| 90a | Edge (First edge) |
| 90b | Edge (First edge) |
| 91 | Upper surface (Fourth surface, Sixth surface) |
| 93 | Lower surface (Third surface, Fifth surface) |
| 156 | Pressing unit (Second pressing section) |
| 157 | Pressing unit (Second pressing section) |
| 158 | Contact section (Second contact section) |
| 159 | Contact section (Second contact section) |
| 256 | Pressing unit (First pressing section) |
| 257 | Pressing unit (First pressing section) |
| 258 | Contact section (First contact section) |
| 259 | Contact section (First contact section) |
| 300 | Scarfing machine (Scarfing machine) |
| 360 | Disc transport mechanism (First-edge transporting unit) |
| 361 | Disc |
| 361a | Outer peripheral surface (Mount section, Outer peripheral surface) |
| 362 | Disc transport mechanism (First-edge transporting unit) |
| 363 | Disc |
| 363a | Outer peripheral surface (Mount section, Outer peripheral surface) |
| 400 | Scarfing machine (Scarfing machine) |
| 460 | Disc transport mechanism (First-edge transporting unit) |
| 461 | Disc |
| 461a | Outer peripheral surface (Mount section, Outer peripheral surface) |
| 462 | Disc transport mechanism (First-edge transporting unit) |
| 463 | Disc |
| 463a | Outer peripheral surface (Mount section, Outer peripheral surface) |
| 500 | Scarfing machine (Scarfing machine) |
| 560 | Disc transport mechanism (First-edge transporting unit) |
| 561 | Disc |
| 561a | Outer peripheral surface (Mount section, Outer peripheral surface) |

-continued

| REFERENCE SIGNS LIST | |
|---|---|
| 562 | Disc transport mechanism (First-edge transporting unit) |
| 563 | Disc |
| 563a | Outer peripheral surface (Mount section, Outer peripheral surface) |
| 604 | Clamping-transporting unit (Holding-transporting unit) |
| 620 | Upper-side conveyor |
| 622 | Lower-side conveyor |
| 704 | Clamping-transporting unit (Holding-transporting unit) |
| 720 | Upper-side clamping roll |
| 722 | Lower-side clamping roll |
| 8A | Supporting table |
| 9A | Supporting table |
| 56A | Pressing unit (Pressing unit) |
| 57A | Pressing unit (Pressing unit) |
| 58A | Contact section |
| 58A1 | Portion in contact section 58A that is opposite to outer surfaces OS, OS (First contact section, fourth contact section) |
| 58A2 | Portion in contact section 58A that is opposite to upper surfaces 54a, 55a (Second contact section, fifth contact section) |
| 59A | Contact section (First contact section, fourth contact section) |
| 59A1 | Portion in contact section 59A that is opposite to outer surfaces OS, OS (First contact section, fourth contact section) |
| 59A2 | Portion in contact section 59A that is opposite to upper surfaces 54a, 55a (Second contact section, fifth contact section) |
| 156A | Pressing unit (Second pressing section) |
| 157A | Pressing unit (Second pressing section) |
| 158A | Contact section (Second contact section) |
| 159A | Contact section (Second contact section) |
| 256A | Pressing unit (First pressing section) |
| 257A | Pressing unit (First pressing section) |
| 258A | Contact section (First contact section) |
| 259A | Contact section (First contact section) |
| 808A | Supporting table |
| 809A | Supporting table |
| R1 | Guide rail |
| R2 | Guide rail |
| VHP | Virtual horizontal surface |
| M1 | Motor |
| M2 | Motor |
| M3 | Motor (Motor, Driving section) |
| RS | Rotational shaft |
| BR | Bracket |
| VL | Virtual line |
| P1 | Central point |
| SS | Swing shaft |
| BLT | Endless belt (Endless belt) |
| IS | Inner surface (Second surface) |
| OS | Outer surface (Mount section, First surface) |
| CP | Point |
| TD | Transport direction (Transport direction) |
| FD | Fiber direction (Fiber direction) |
| CpL | Contact position (Contact position) |
| R | Rod |
| Br | Block member |
| PpL | Pressing position (Pressing position) |
| Pr1 | Pulley |
| Pr2 | Pulley |
| Pr3 | Pulley (First Pulley) |
| Pr4 | Pulley |
| Pr5 | Pulley (Driving section) |
| Pr6 | Pulley (Driving section) |
| VP | Virtual plane (Virtual plane) |
| PT | Power transmitting member (Driving section) |
| UE | Concave and convex parts |
| RSFT | Rotational shaft |
| FL | Floor surface |
| a1 | Distance from the projections of contact sections 58, 59 in a pressable state to the projections of outer surfaces OS, OS (First distance) |
| a2 | Distance from the projections of contact sections 58, 59 in a pressable state to the projections of upper surfaces 54a, 55a (Second distance) |
| a3 | Distance from the projections of contact sections 258, 259 in a pressable state to the projections of outer surfaces OS, OS (First distance) |
| a4 | Distance from the projections of contact sections 158, 159 in a pressable state to the projections of upper surfaces 54a, 55a (Second distance) |
| a5 | Distance from the projections of contact sections 58, 59 in a pressable state to the projections of outer peripheral surface 361a, 363a, 461a, 463a, 561a, 563a (Third distance) |

-continued

| REFERENCE SIGNS LIST | |
|---|---|
| a6 | Distance from the projections of contact sections 58, 59 in a pressable state to the projections of upper surfaces 54a, 55a (Fourth distance) |
| t | Plate thickness (Plate thickness) |

The invention claimed is:

1. A scarfing machine for machining a scarf face on a first edge of a veneer in the fiber direction of the veneer while transporting the veneer, the scarfing machine comprising:
   a frame;
   a holding-transporting unit including a holding unit for holding the veneer such that the first edge protrudes and the protruding first edge extends in a transporting direction of the veneer, wherein the holding-transporting unit is disposed on the frame to be movable in the transporting direction;
   a machining unit having a cutter for machining the scarf face, wherein the machining unit is positioned intermediate of a transport path of the veneer such that a projection of the first edge intersects with a projection of the cutter on a first virtual projection plane when viewed from one side of the transport direction;
   a first-edge transporting unit including a mount section for mounting the first edge at least at a contact position where the first edge and the cutter first come into contact, wherein the first-edge transporting unit is configured for transporting the first edge in the transport direction at least at the contact position and a pressing position that is upstream of and adjacent to the contact position in the transport direction; and
   a pressing unit disposed at least partially inside of a projection area of the mount section on a second virtual projection plane when viewed from one side in the vertical direction, such that the pressing unit presses the first edge toward the mount section at the pressing position.

2. The scarfing machine according to claim 1, wherein
   the first-edge transport unit is a conveyor having an endless belt as the mount section,
   the endless belt includes a first surface for mounting the first edge and a second surface opposite to the first surface,
   the first edge includes a third surface that is able to contact the first surface and a fourth surface opposite to the third surface,
   the pressing unit includes a first contact section configured for contacting the fourth surface and disposed opposite to the first surface, and
   a first distance from a projection of the first contact section of the pressing unit in a pressable state on the first virtual projection plane to a projection of the first surface on the first virtual projection plane is less than or equal to a plate thickness of the first edge.

3. The scarfing machine according to claim 2, further comprising:
   a supporting unit disposed at a position adjacent to the first-edge transport unit and opposite to the holding unit with respect to the first-edge transport unit when viewed from one side of the transport direction, such that the supporting unit supports the first edge at least at the contact position, wherein
   the pressing unit further includes a second contact section configured for contacting the fourth surface,
   the supporting unit includes a third contact section disposed opposite to the second contact section and configured for contacting the third surface, and
   a second distance from a projection of the second contact section of the pressing unit in a pressable state on the first virtual projection plane to a projection of the third contact section on the first virtual projection plane is less than or equal to a plate thickness of the first edge.

4. The scarfing machine according to claim 2, wherein
   the conveyor includes a first pulley around which the endless belt is wound, and a motor connected to the first pulley for rotating the first pulley,
   the first pulley is configured for contacting the first surface, and
   the coefficient of friction between the first pulley and the first surface is greater than the coefficient of friction between the first pulley and the second surface.

5. The scarfing machine according to claim 3 which is dependent on claim 3, wherein
   the pressing unit includes a first pressing section having the first contact section and a second pressing section having the second contact section.

6. The scarfing machine according to claim 1, further comprising:
   a supporting unit disposed at a position adjacent to the first-edge transport unit and opposite to the holding unit with respect to the first-edge transport unit when viewed from one side of the transport direction, such that the supporting unit supports the first edge at least at the contact position, wherein
   the first-edge transport unit includes a disc body having an outer peripheral surface as the mount section, and a driving section for rotating the disc body,
   the first edge includes a fifth surface that is able to contact the outer peripheral surface, and a sixth surface opposite to the fifth surface,
   the pressing unit includes a fourth and a fifth contact section for contacting the sixth surface,
   the supporting unit includes a sixth contact section for contacting the fifth surface,
   the fourth contact section is arranged to face the outer peripheral surface,
   the fifth contact section is arranged to face the supporting unit,
   a third distance from a projection of the fourth contact section of the pressing unit in a pressable state on the first virtual projection plane to a projection of the outer peripheral surface on the first virtual projection plane is equal to or less than a plate thickness of the first edge, and
   a fourth distance from a projection of the fifth contact section of the pressing unit in a pressable state on the first virtual projection plane to a projection of the sixth contact section on the first virtual projection plane is less than or equal to a plate thickness of the first edge.

7. The scarfing machine according to claim 6, wherein the disc body has concave and convex parts on the outer peripheral surface.

8. The scarfing machine according to claim 1, further comprising:

a control unit for controlling the holding-transporting unit and the first-edge transport unit, wherein the control unit is configured to determine a transport speed of the first edge by the first-edge transport unit, based on a moving speed of the holding-transporting unit in the transport direction, and to control the first-edge transport unit such that the first edge is transported at the determined transport speed.

9. The scarfing machine according to claim 8, wherein the control unit is configured to control the first-edge transport unit such that the transport speed of the first edge by the first-edge transport unit is lower than the transport speed of the veneer by the holding-transporting unit until the first edge reaches the contact position.

10. The scarfing machine according to claim 8, wherein the control unit is configured to control the first-edge transport unit such that the transport speed of the first edge by the first-edge transport unit is greater than the transport speed of the veneer by the holding-transporting unit after the first edge has reached the contact position.

11. The scarfing machine according to claim 8, wherein the control unit is configured to control the first-edge transport unit such that the transport speed of the first edge by the first-edge transport unit is equal to the transport speed of the veneer by the holding-transporting unit.

* * * * *